US011401054B2

(12) United States Patent
Hejmanowski et al.

(10) Patent No.: US 11,401,054 B2
(45) Date of Patent: *Aug. 2, 2022

(54) GUIDELESS RESILIENT ANDROGYNOUS SERIAL PORT DOCKING MECHANISM

(71) Applicant: CU Aerospace, LLC, Champaign, IL (US)

(72) Inventors: Neil Hejmanowski, Urbana, IL (US); Alex Ghosh, Brambleton, VA (US); David L. Carroll, Champaign, IL (US)

(73) Assignee: CU Aerospace, LLC, Champaign, IL (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/953,420

(22) Filed: Nov. 20, 2020

(65) Prior Publication Data
US 2021/0086922 A1     Mar. 25, 2021

Related U.S. Application Data

(63) Continuation-in-part of application No. 16/740,546, filed on Jan. 13, 2020, now Pat. No. 10,882,645.

(60) Provisional application No. 62/791,918, filed on Jan. 14, 2019.

(51) Int. Cl.
*B64G 1/64* (2006.01)
*B64G 1/10* (2006.01)

(52) U.S. Cl.
CPC ...... *B64G 1/646* (2013.01); *B64G 2001/1092* (2013.01)

(58) Field of Classification Search
CPC .................. B64G 1/64; B64G 1/646
See application file for complete search history.

(56) References Cited

U.S. PATENT DOCUMENTS

| 6,969,030 B1 * | 11/2005 | Jones | B64G 1/646 244/135 A |
| 7,543,779 B1 * | 6/2009 | Lewis | B64G 1/646 244/172.4 |
| 2015/0266595 A1 * | 9/2015 | Ghofranian | B64G 1/222 244/172.4 |

FOREIGN PATENT DOCUMENTS

| CN | 104760710 | 12/2016 |
| WO | 2013138936 | 9/2013 |

OTHER PUBLICATIONS

International Search Report and Written Opinion, dated May 8, 2020, Korean IP Office, corresponding PCT/US2020/013267.

* cited by examiner

*Primary Examiner* — Richard G Davis
(74) *Attorney, Agent, or Firm* — Adam K. Sacharoff; Much Shelist, PC

(57) ABSTRACT

The Guideless Resilient Androgynous Serial Port (GRASP) mechanism provides an androgynous mechanical and electrical interface that can be tailored to the meet the requirements of a given application. Each mechanism is equipped with physical connections (spring pins) for both power and data transmission between modules.

23 Claims, 24 Drawing Sheets

GRASP mechanism brassboard illustration showing spring pin array.

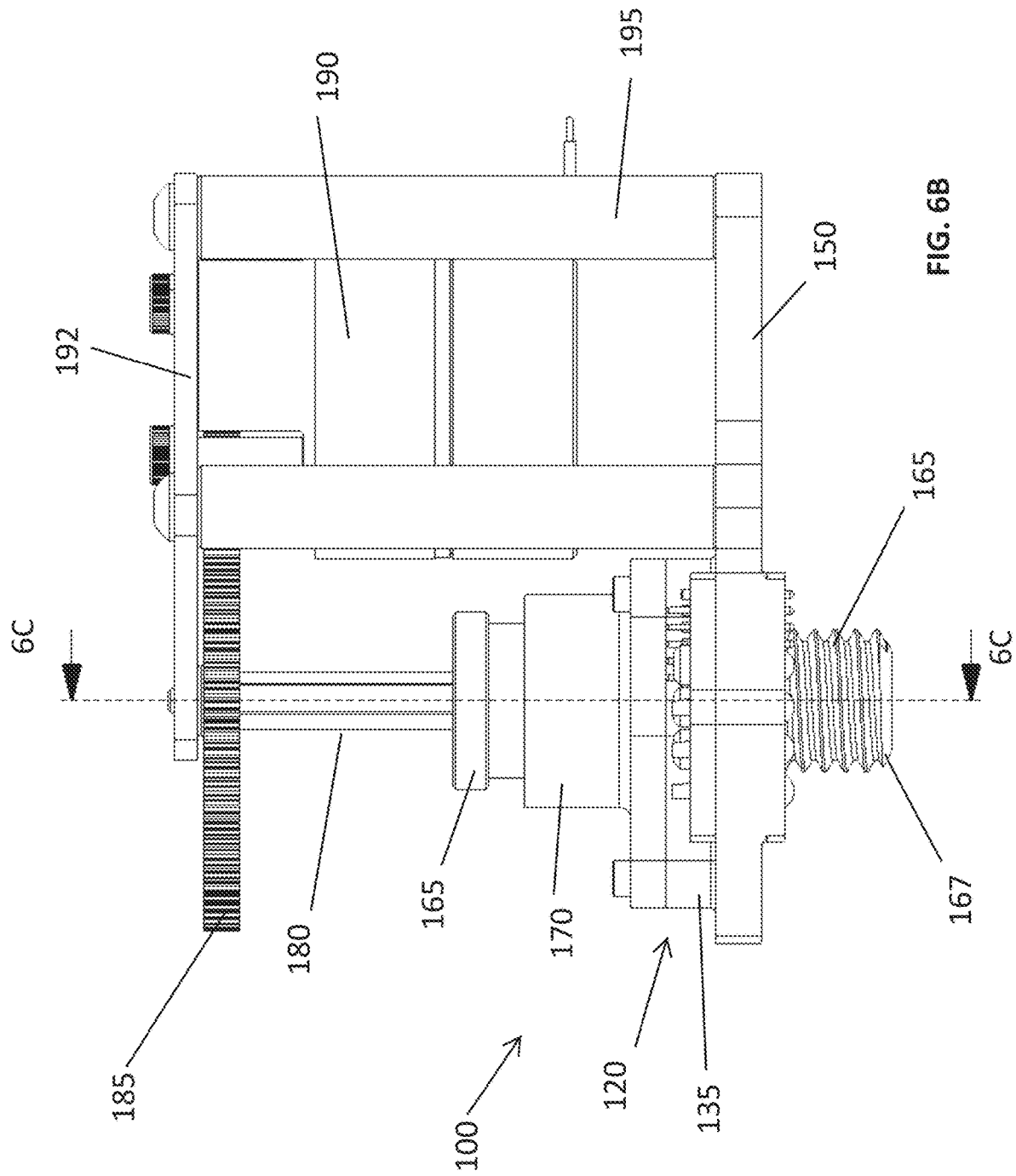

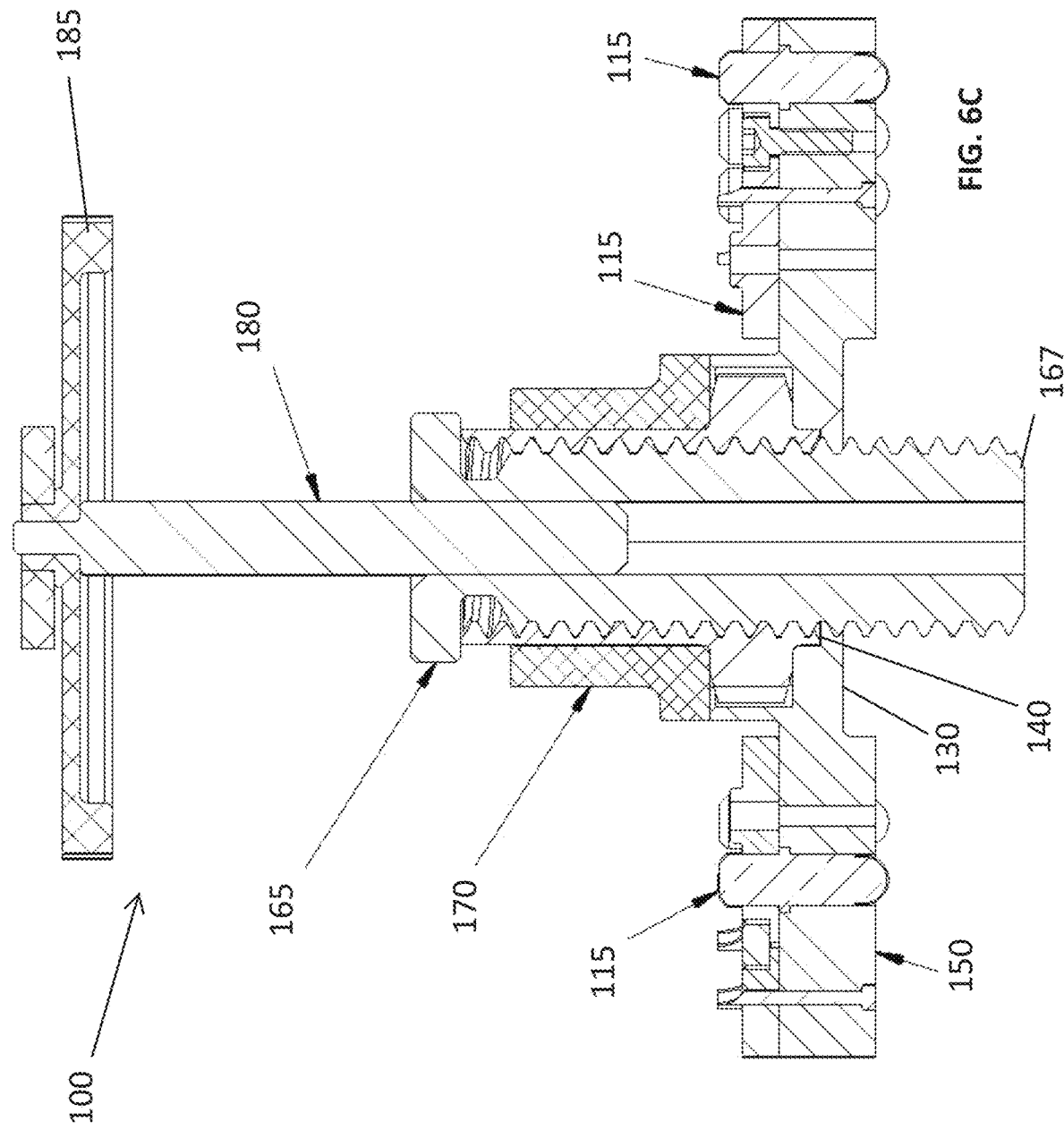

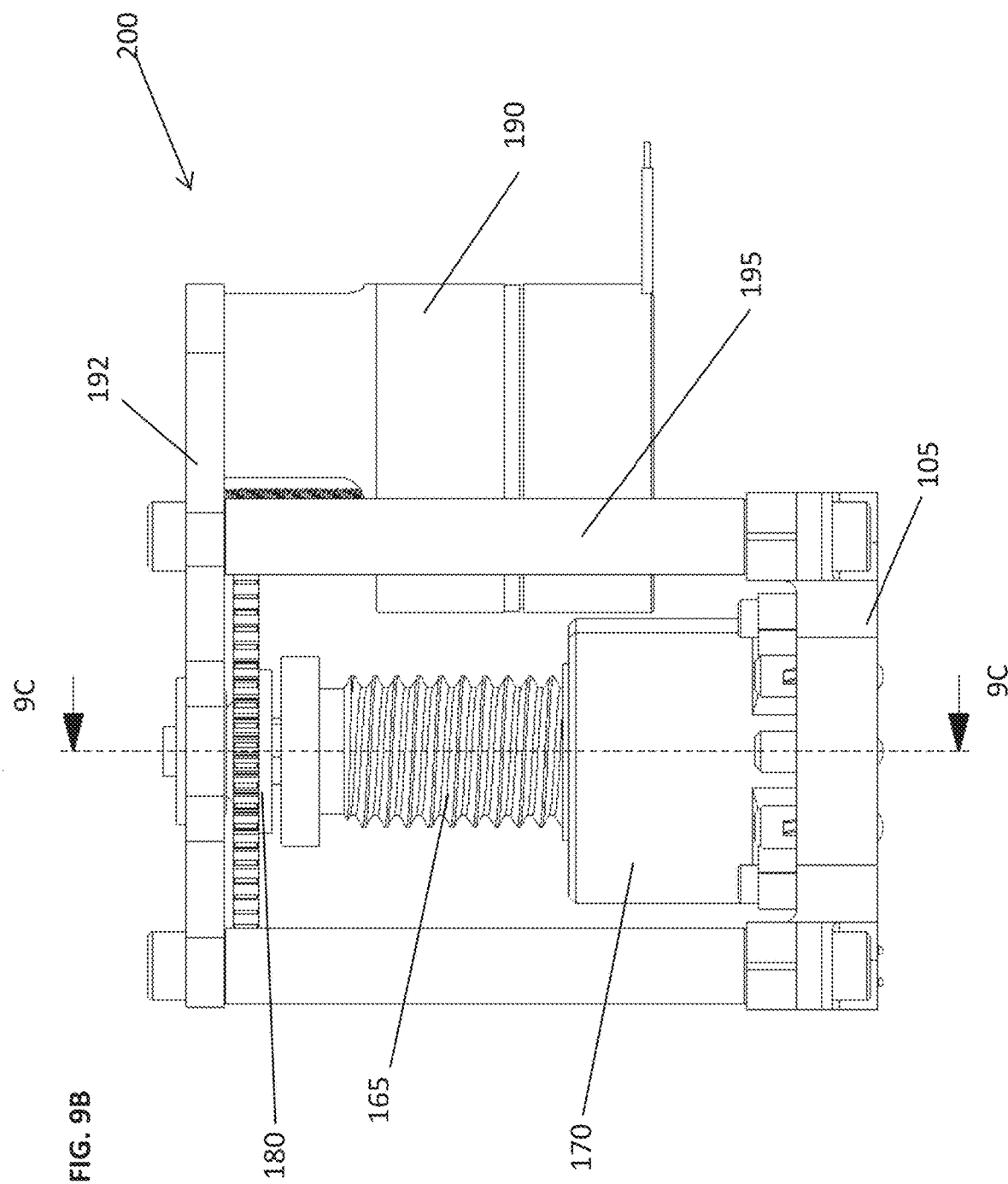

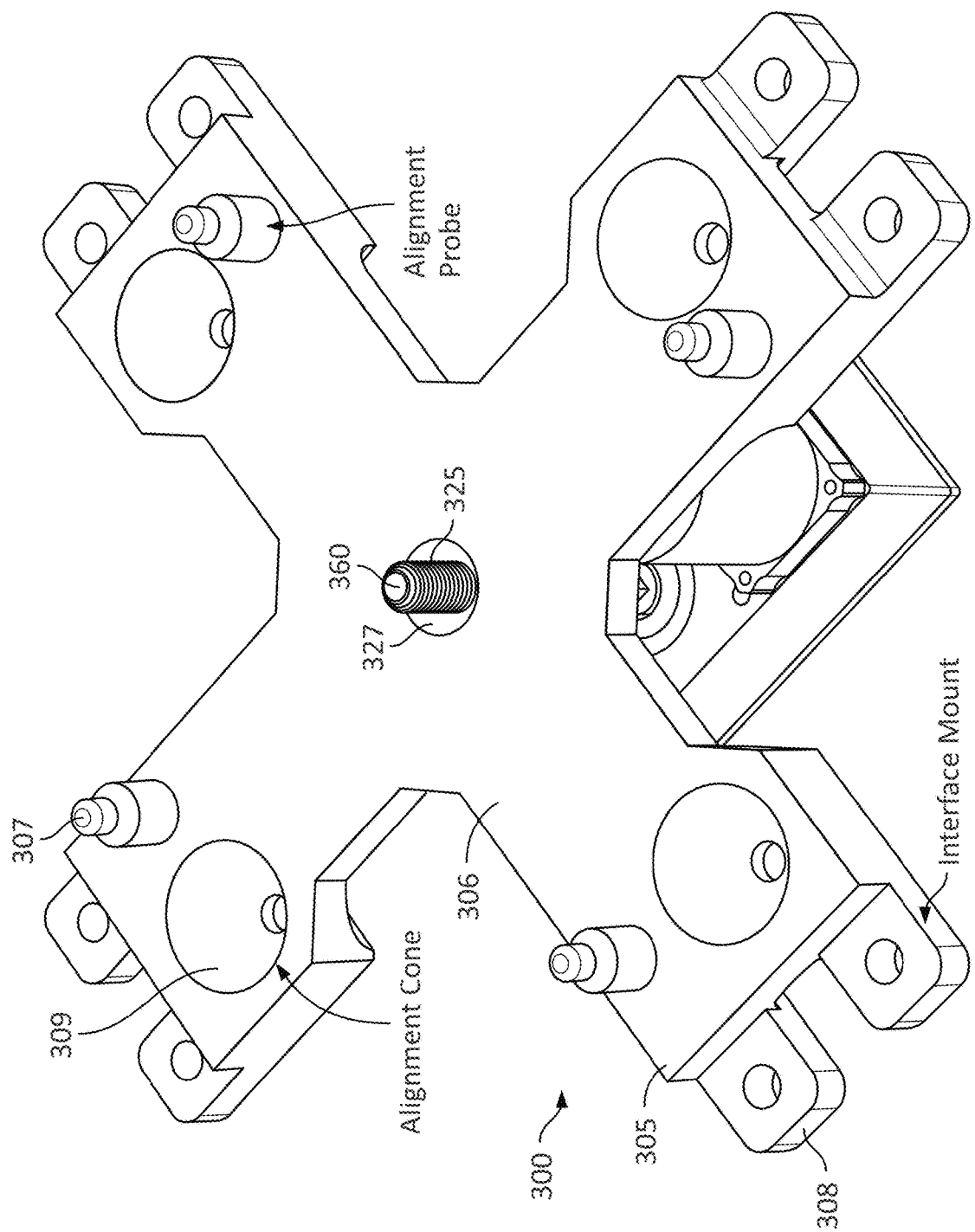

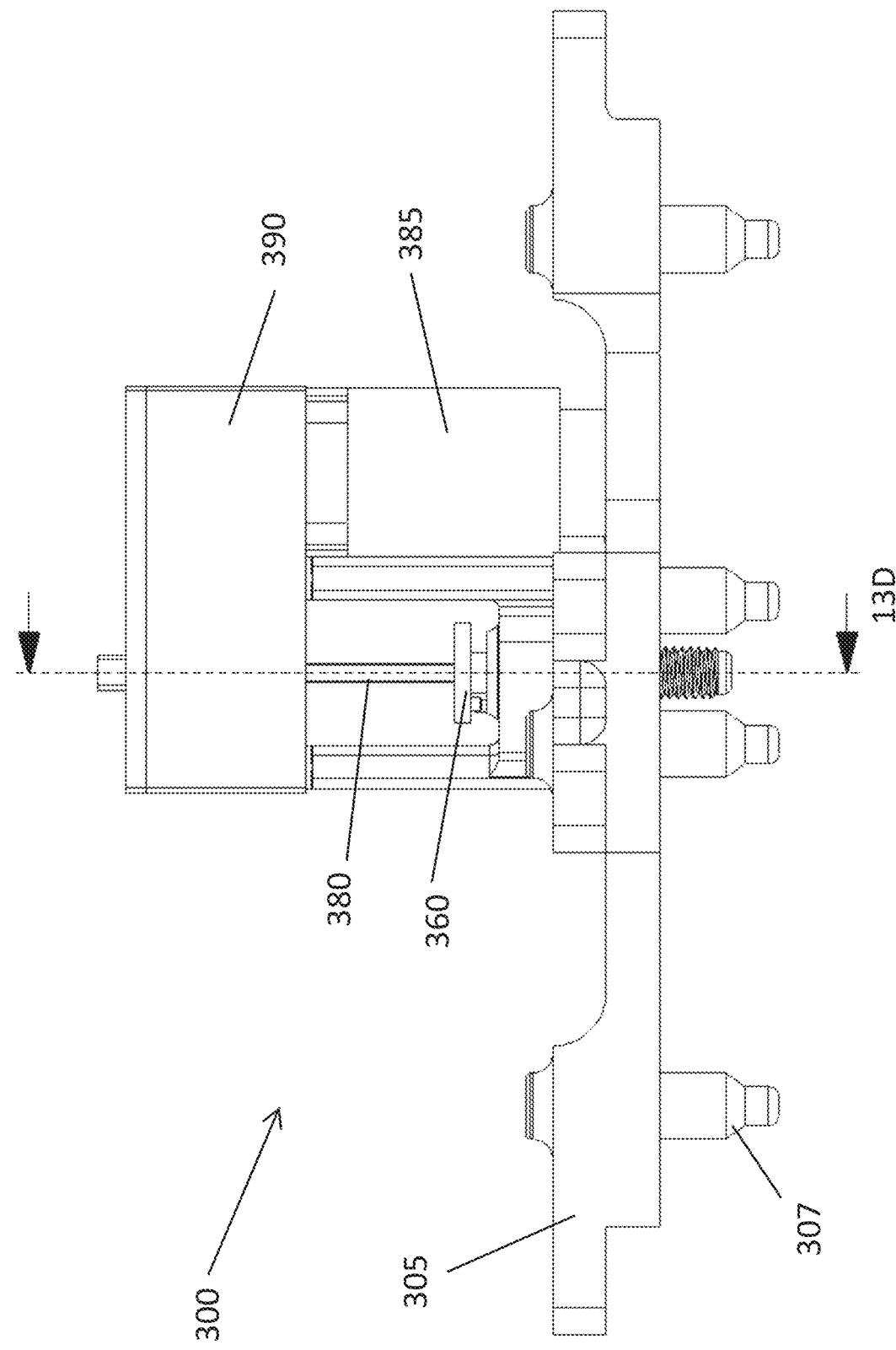

GUIDELESS RESILIENT ANDROGYNOUS SERIAL PORT DOCKING MECHANISM

CROSS REFERENCE TO RELATED APPLICATIONS

The present application is a Continuation of U.S. application Ser. No. 16/740,546 filed Jan. 13, 2020, which claims priority to US Provisional Application 62/791,918 filed Jan. 14, 2019, both of which are hereby incorporated herein by reference.

GOVERNMENT CONTRACT

The invention was made with government support with United States Government Agency, Defense Advanced Research Projects Agency under Contracts D16PC00182 and D17PC00307. The Government has certain rights in the invention.

BACKGROUND OF THE INVENTION

Modular spacecraft concepts provide a unique challenge for docking port design, requiring an androgynous, retractable docking port with at least 90° rotational symmetry to enable multiple docking orientations, while supplying physical connections for both data and power transmission. In order to enable docking in more than two orientations, early USIP design concepts required a combination of linear and rotary actuators which occupy a sizeable volume and increase complexity by adding a degree of freedom to the docking system, which will need to be restrained to secure the dock.

The DARPA SYNERGEO Phase I effort (contract #D16PC00182) to develop a functional docking interface design started with the existing concepts and a literature search for past spacecraft docking port designs. Until the turn of the century, spacecraft docking port design was focused on human-rated technology to enable missions to orbiting research and observation platforms such as Spacelab, MIR and the ISS. This information provided some useful insight into the various strategies for spacecraft approach and docking, and the underlying technologies that enable these large, retractable and androgynous docking solutions provided a useful starting reference for the development of the GRASP. Shifting focus to the realm of small satellites, there have been some interesting developments in the last 15 years, but domestic efforts have largely eschewed androgyny and the ability to retract in favor of emulating the classical probe-drogue port design, which is time-tested and proven in both space and atmosphere. Publicly available information on recent domestic developments include the non-androgynous Mechanical Docking System used on Orbital Express, the SPHERES androgynous but asymmetric Universal Docking Port (UDP) demonstrated successfully on the ISS, the Autonomous Satellite Docking System (ASDS) developed and demonstrated by Michigan Aerospace, the AMODS electro-magnetic docking system under development at the US Naval Academy, and Velcro pads, which are non-androgynous and unreliable in structural applications.

All these docking ports fail to meet SYNERGEO requirements for symmetric androgyny. International efforts in the realm of small satellite docking ports have yielded several concepts; two of the relevant concepts are a semi-androgynous docking interface under development at the University of Padova, Italy, and the port utilized in the German iBOSS effort, which is a potential option for the modular spacecraft concept. The port under development at University of Padova is an innovative concept that can switch between probe and drogue functions as needed and uses a central spring-loaded plunger to supply the force necessary to maintain secure docking.

SUMMARY OF THE INVENTION

The Guideless Resilient Androgynous Serial Port (GRASP) mechanism provides an androgynous mechanical and electrical interface that can be tailored to the meet the requirements of a given application. Developed under the DARPA SYNERGEO program (Phase I #D16PC00182 and Phase II #D17PC00307), assembly interfaces comprised of a multi-GRASP array and a single mechanism have been developed. Each mechanism is equipped with physical connections (spring pins) for both power and data transmission between modules.

Numerous other advantages and features of the invention will become readily apparent from the following detailed description of the invention and the embodiments thereof, from the claims, and from the accompanying drawings.

BRIEF DESCRIPTION OF THE FIGURES

The patent or application file contains at least one drawing executed in color. Copies of this patent or patent application publication with color drawing(s) will be provided by the Office upon request and payment of the necessary fee. A fuller understanding of the foregoing may be had by reference to the accompanying drawings, wherein:

FIGS. 6A-6C are illustrated views of the GRASP breadboard prototype, shown in the 'active' configuration (docking screw fully extended); this first prototype is equipped with a ratchet to enable androgyny, with the teeth integrated into the docking nut.

FIGS. 9A-9C are detailed view of the GRASP v1 prototype, shown in the 'passive' configuration (docking screw fully retracted); this prototype uses a needle roller clutch to enable androgyny.

FIG. 11 illustrate a GRASP v2 mechanism contact surface features.

FIGS. 13A-13D show detailed views of the GRASP v2 prototype, to be used for the SYNERGEO single-point GRASP interface, shown in the 'active' configuration (docking screw fully extended); this prototype uses a needle roller clutch to enable androgyny.

DESCRIPTION OF THE INVENTION

Figure 1:
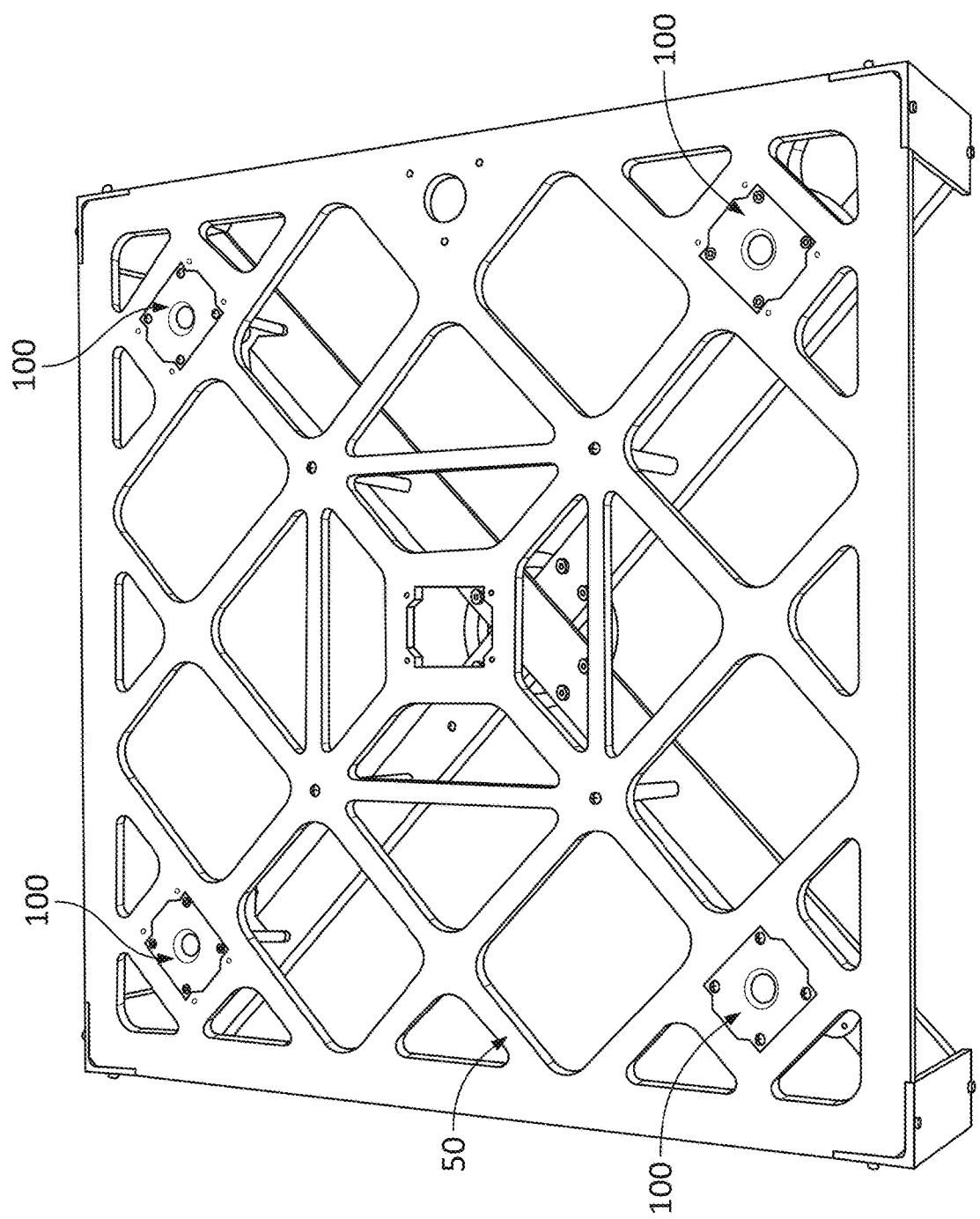
FIG. 1 is a test apparatus equipped with four Generic Resilient Androgynous Serial Port (GRASP) v1 prototypes (corners), this apparatus is used to demonstrate a multi-point GRASP interface that exhibits 90° rotational symmetry normal to the contact plane.
Figure 2A:
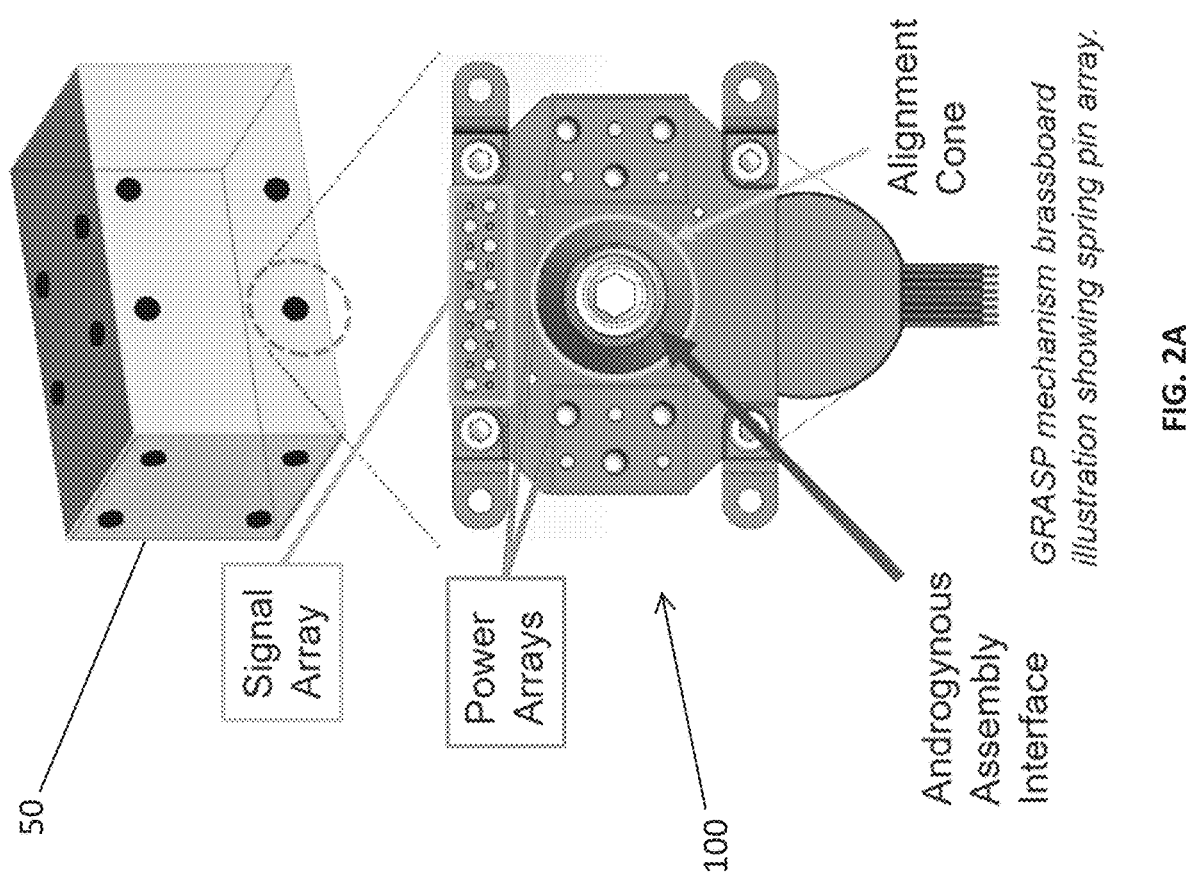
FIGS. 2A-2B illustrate a multi-point (2A) and single-point (2B) GRASP interface concepts, the GRASP spring pin arrays are designed to enable connections between identical mechanisms.
Figure 2B:
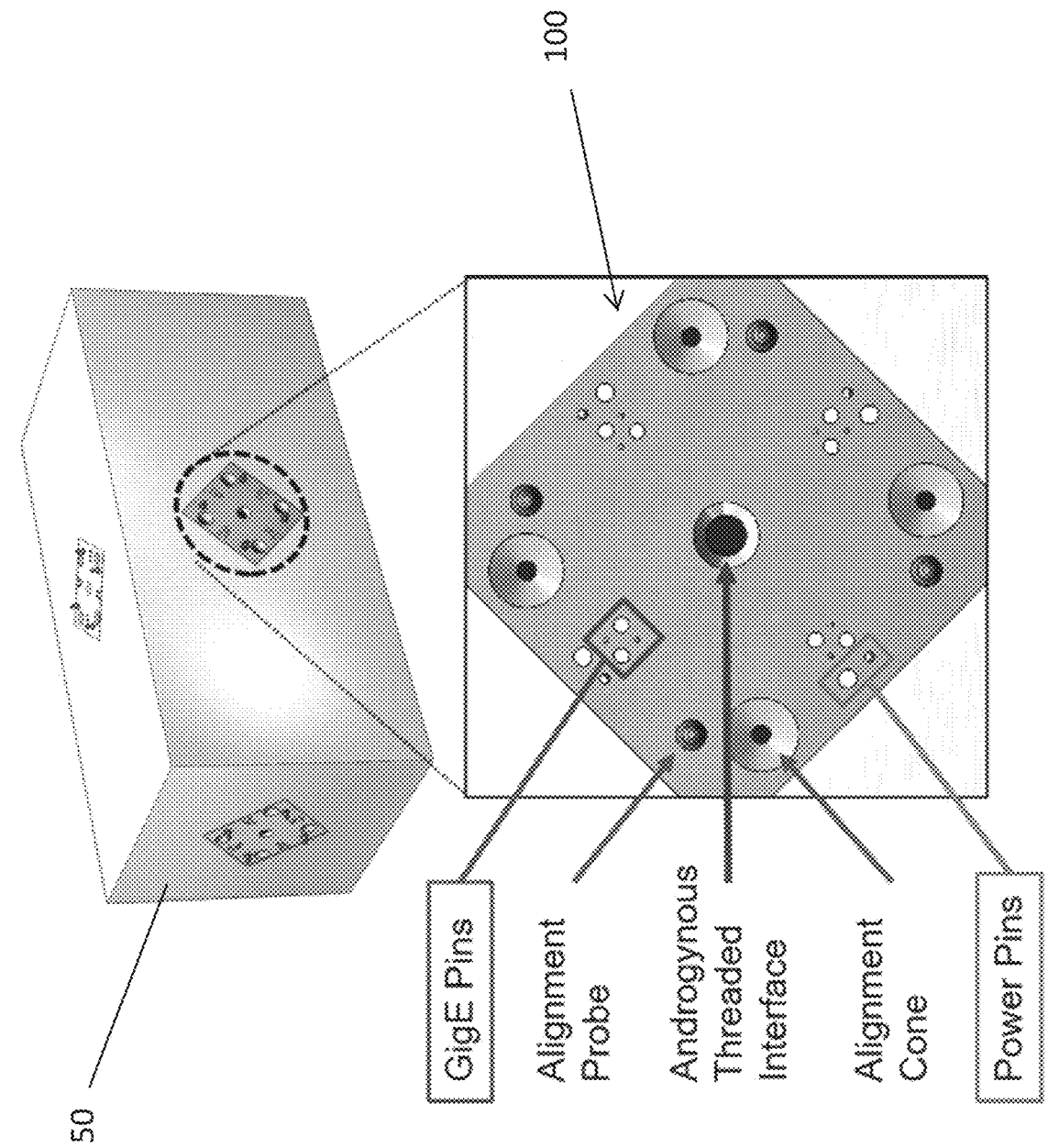

The apparatuses shown in FIGS. 1 and 2A are an equally-spaced array of 4 GRASP v1 mechanisms 100 mounted to a structural plate 50 built to simulate a face of a SYNERGEO spacecraft, with a single GRASP mechanism with a four-point connection in FIG. 2B. The array includes power connections rated for 360 A power transmission (90 A per mechanism) and 20 discrete pairs of low-power connections for data transmission. The large number of low-power pins enable a tailored approach to communications from module to module and throughout the modular spacecraft platform based on payload requirements for security, bandwidth, or noise. Secure mating between modules equipped with a 4-point interface can be accomplished using as few as two diagonally opposed mechanisms, providing a high level of redundancy in comparison to existing solutions.

Figure 3:
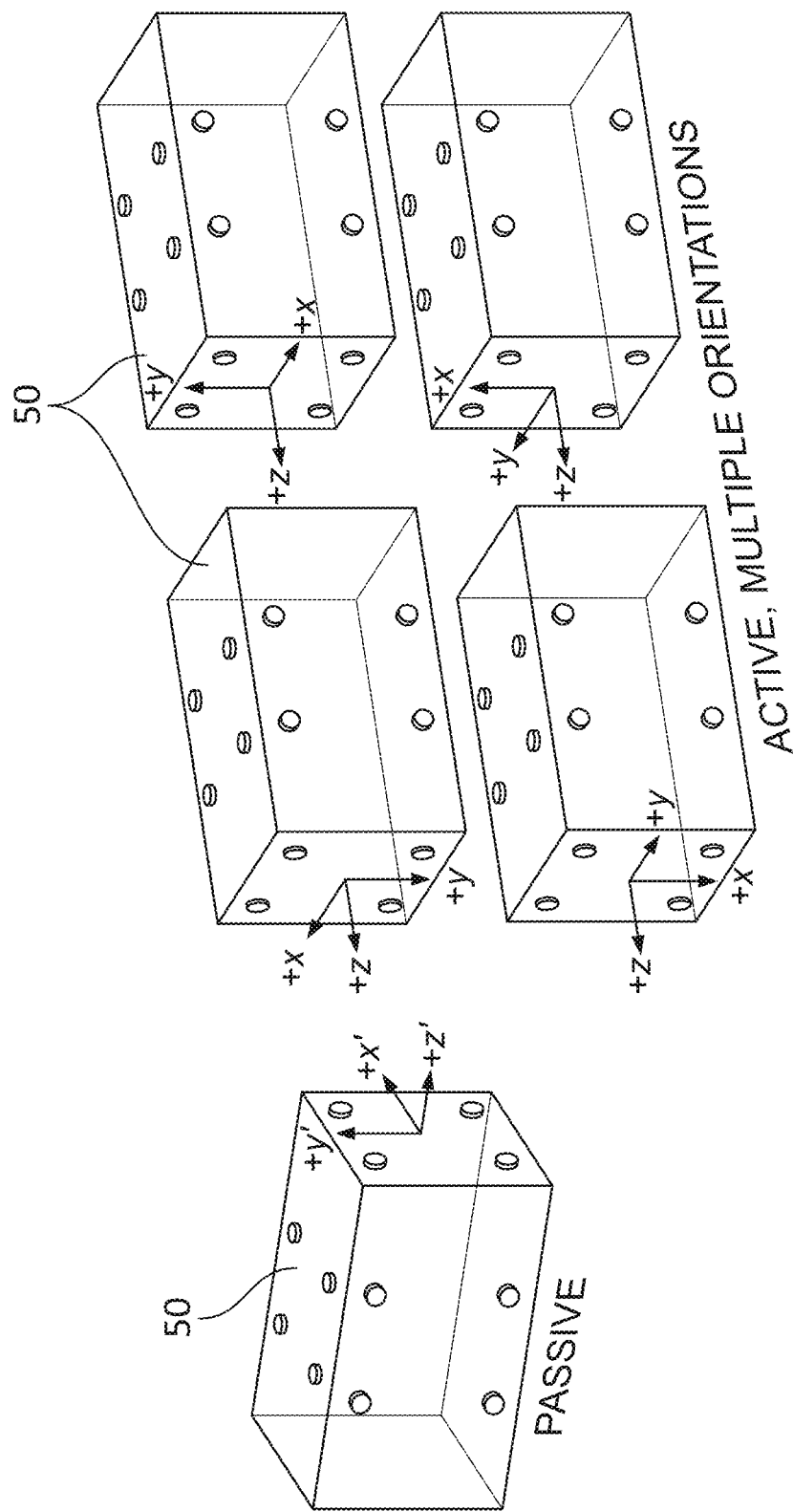
FIG. 3 illustrates the multi-point GRASP array designed for SYNERGEO, which allows a pair of module interfaces to mate successfully in four orientations, each established by rotating one of the two bodies by 90° about the +z axis of its interface. In the example above, the passive body is held stationary while the active is rotated.
Figure 4A:
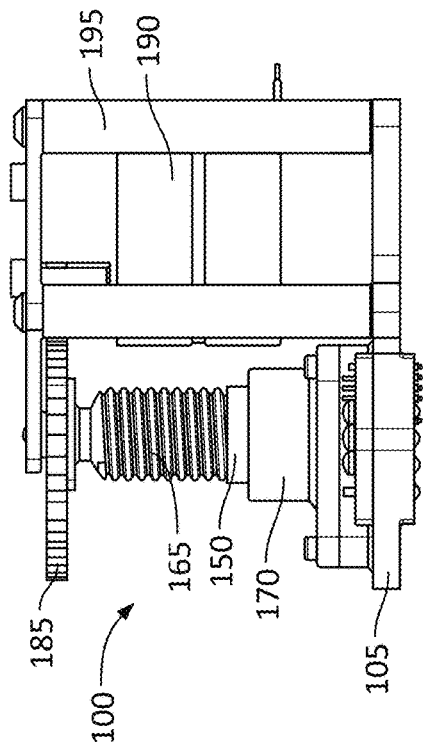
FIGS. 4A-4D are illustrations of a GRASP breadboard prototype.
Figure 4B:
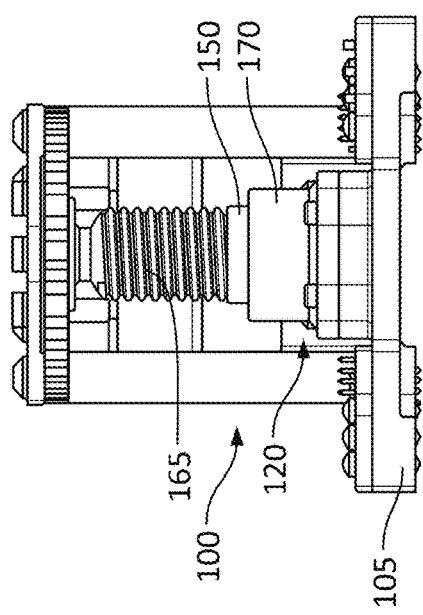
Figure 4C:
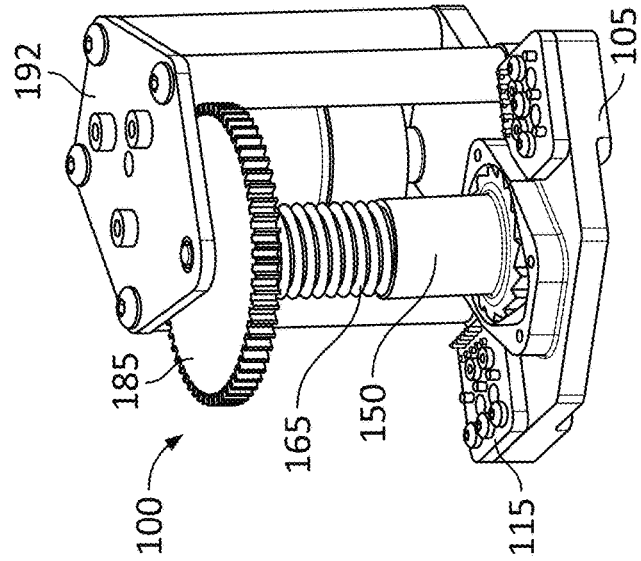
Figure 4D:
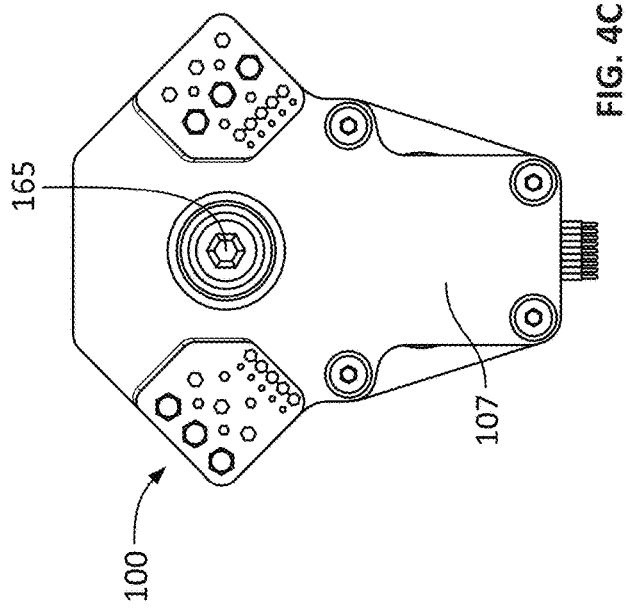
Figure 5:
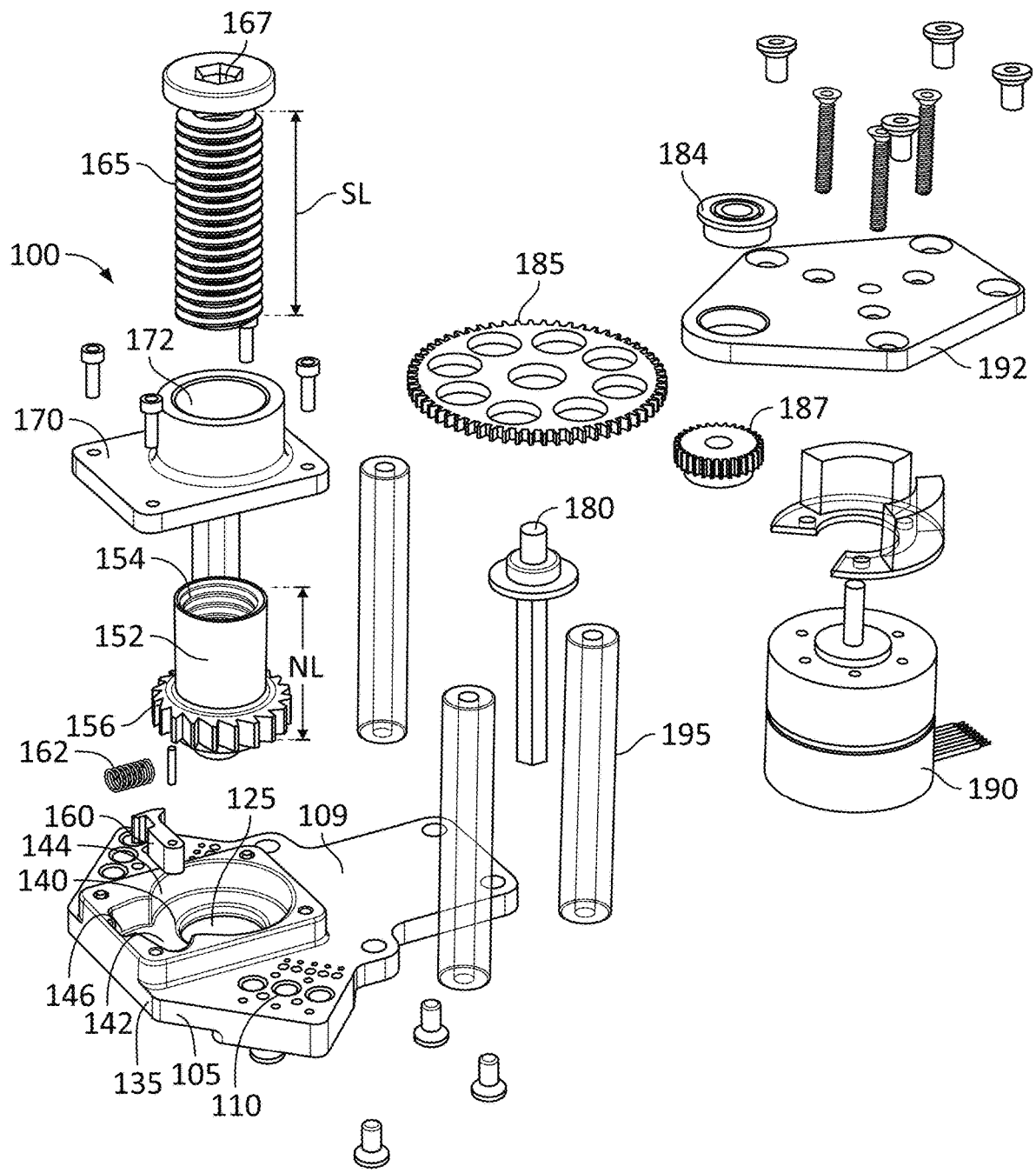
FIG. 5 is an exploded view of the GRASP breadboard prototype equipped with an integrated ratchet.

Note that 90° rotational symmetry at the interface, illustrated in FIG. 3, is a requirement for SYNERGEO that has been satisfied with both a multi-GRASP array and a single GRASP mechanism. FIG. 3 shows the multi-point GRASP array designed for SYNERGEO, which allows a pair of module interfaces to mate successfully in four orientations, each established by rotating one of the two bodies by 90° about the +z axis of its interface. In the example above, the passive body is held stationary while the active is rotated. The modular and customizable features of the GRASP mechanism 100 and interface concept provide the spacecraft builder a variety of approaches to satisfying structural, electrical, and morphological constraints particular to a given application.

Figure 6A:
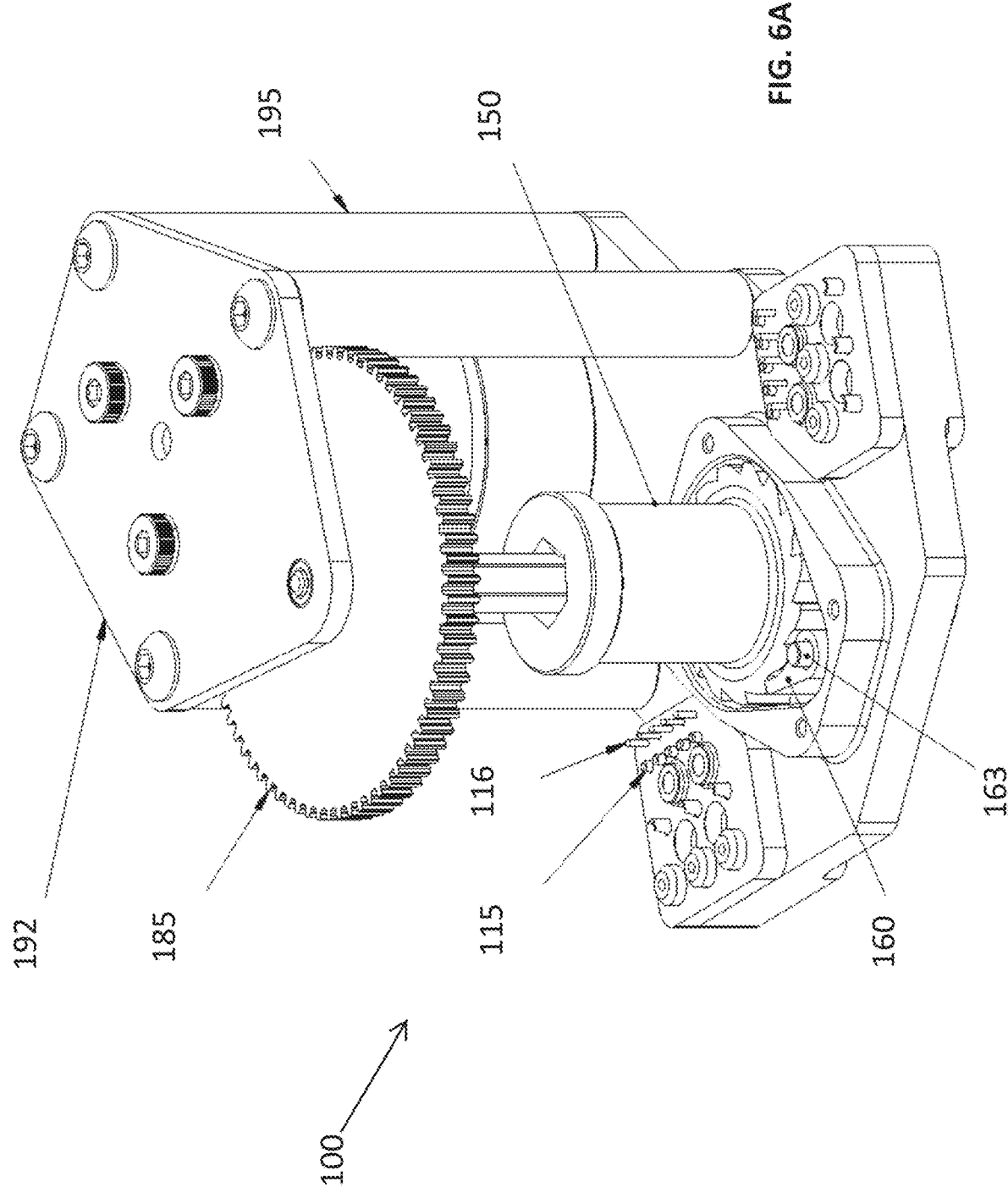

At a fundamental level, the GRASP mechanism 100 provides a mechanical connection through a bolted joint. The novelty of GRASP is the androgyny of the mechanism; a GRASP in the 'passive' configuration, FIGS. 4A-4D, has the docking screw fully retracted and acts as the nut, while a GRASP in the 'active' configuration, FIGS. 6A-6C, has the docking screw fully extended and acts as the bolt. This androgyny is made possible by allowing the docking nut to rotate (freewheel) about its cylindrical axis in only one direction.

As provided in greater detail for FIGS. 4A-6C, the GRASP mechanism 100 has a base plate 105 having an outward facing surface 107 that would serve as the connection surface to another GRASP mechanism. The base plate 105 also has an inward facing surface 109. The base plate 105 has numerous channels bored through to service as conduits 110 for the various supplies or signals, power, water, electrical, data etc. These include various spring pins and pin targets 116, some of which may be referred to commonly as pogo pins used in electrical connector applications. An array 115 of these pins would be connected on the inward facing surface 109 over the conduits 110 and extend to the connection surface such that when two GRASP mechanisms were connected a full signal and supply connection would be made (the various conduit tubing connecting to the array is not shown). Multiple arrays may be employed as needed or required by design.

The GRASP mechanism 100 has a housing unit 120 secured to the base plate 105 over an opening 125 defined in the base plate 105. The outward facing surface 107 may also include an indented surface 130 surrounding the opening 125 to assist in the alignment. The indented surface 130 may have a cylindrical outer wall profile or it may be tapered in a truncated cone (FIG. 9) towards the opening 125 to help guide the docking screw into the opening. The housing unit 120 is defined by a lower housing 135 that is either secured to the inward facing surface 109 of the base plate 105 or the lower housing 135 may be molded with the base plate 105 as a single unitary structure. The lower housing 135 includes a lip 140 surrounding the opening 125 with a ridge 142 extending to a circular surface wall 144. Adjacent a portion of the circular surface wall 144 is a channel cut out 146.

Positioned against the ridge 142 and over the opening 125 is a docking nut 150. The docking nut 150 has a body portion 152 that includes a threaded interior surface 154 with an exterior lower ratchet toothed section 156. The exterior lower ratchet toothed section 156 rotatably sits against the ridge 142 within the circular surface wall 144. A pawl 160 and spring 162 are positioned by a pawl pin 163 in the channel cut out 146 to engage the ratchet toothed section allowing rotation of the docking nut 150 in only a single direction. A docking screw 165 is threaded into the docking nut 150.

Secured to the lower housing is an upper housing 170 used to secure the docking nut and pawl in position. The upper housing 170 includes a bore 172 sized to receive the docking screw and the body portion 152 of the docking nut 150.

The docking screw 165 has an interior channel 167 keyed to receive a profiled driveshaft 180 that when inserted and rotated in either direction will rotate the docking screw 165. The docking screw 165 may further have an extended flat top or dog end 169 used to locate into the docking nut of the other mechanism during connection.

The driveshaft 180 is meshed to a main gear 185 further meshed to spur gear(s) 187 and driven by a motor 190. The top 182 of the drive shaft 180 is rotatably positioned against a bearing 184 mounted to a mounting plate 192. Posts 195 are secured between the mounting plate 192 and the base plate 105 to secure the mounting plate to the base plate with the motor 190 mounted between the two plates as well.

Figure 7:
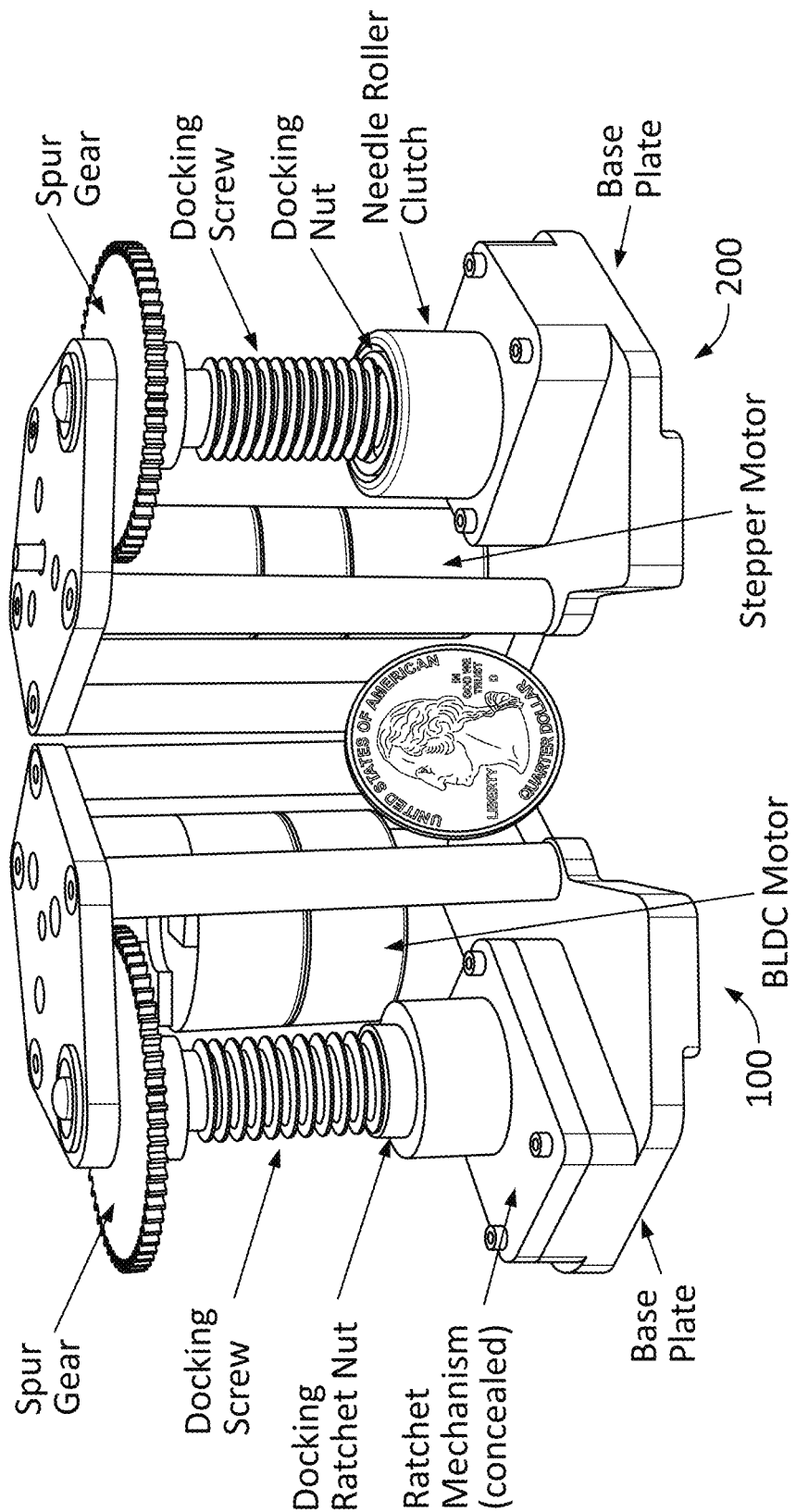
FIG. 7 illustrates GRASP breadboard prototypes; the mechanism to the left integrates a ratchet into the docking nut, while the mechanism to the right uses a needle roller clutch to achieve the desired one-way freewheel behavior.
Figure 8:
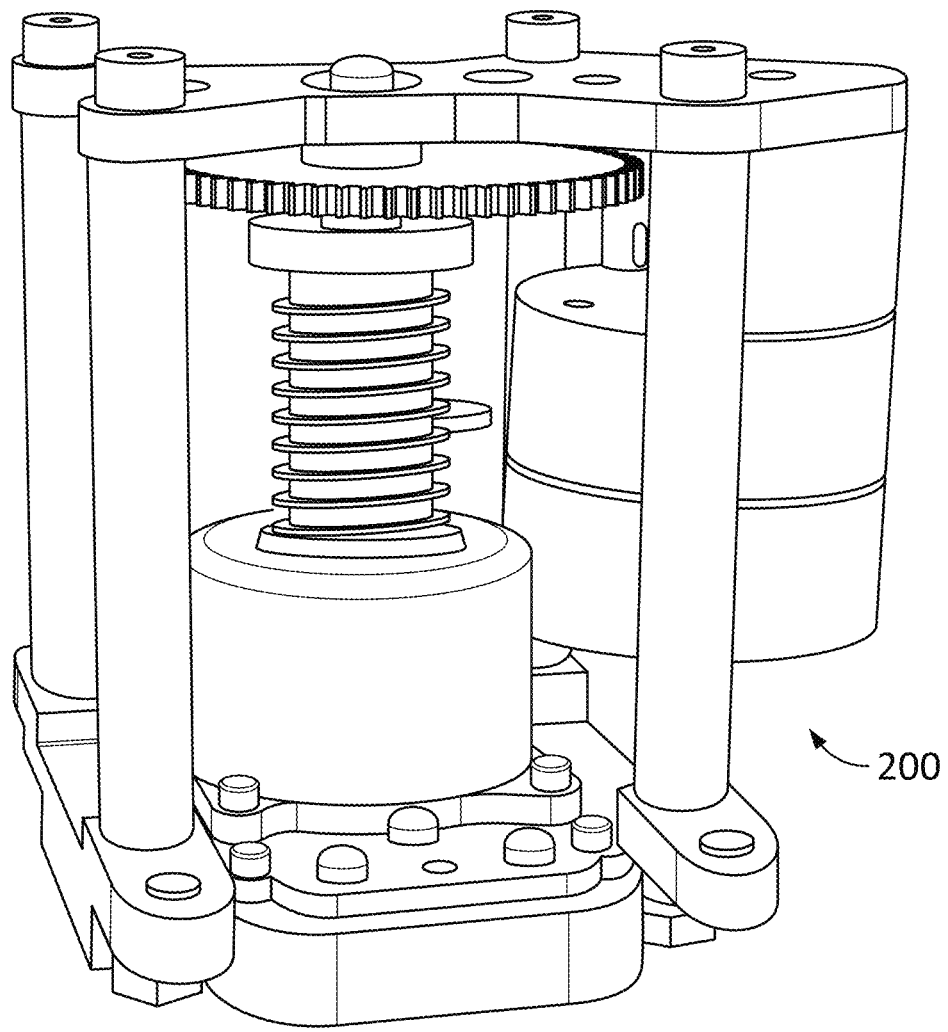
FIG. 8 is a GRASP v1 prototype illustration.

A variety of existing technologies, (e.g. ratchet, one-way bearing, sprag clutch), can be used in the GRASP mechanism to achieve this one-way freewheel motion. The GRASP breadboard mechanism 100 shown in FIGS. 4-7 implements a simple ratchet with teeth integrated into the docking nut and a pawl mounted to the mechanism base plate. Another iteration 200, shown on the right of FIG. 7, replaced the ratchet teeth and pawl of the GRASP 100 mechanism with a flange, and used a one-way bearing known (needle roller clutch) to achieve the desired rotational limit. This approach is applied to the GRASP v1 prototype, FIGS. 8-9C, and in the single-point GRASP interface depicted in FIGS. 11-13.

Figure 9A:
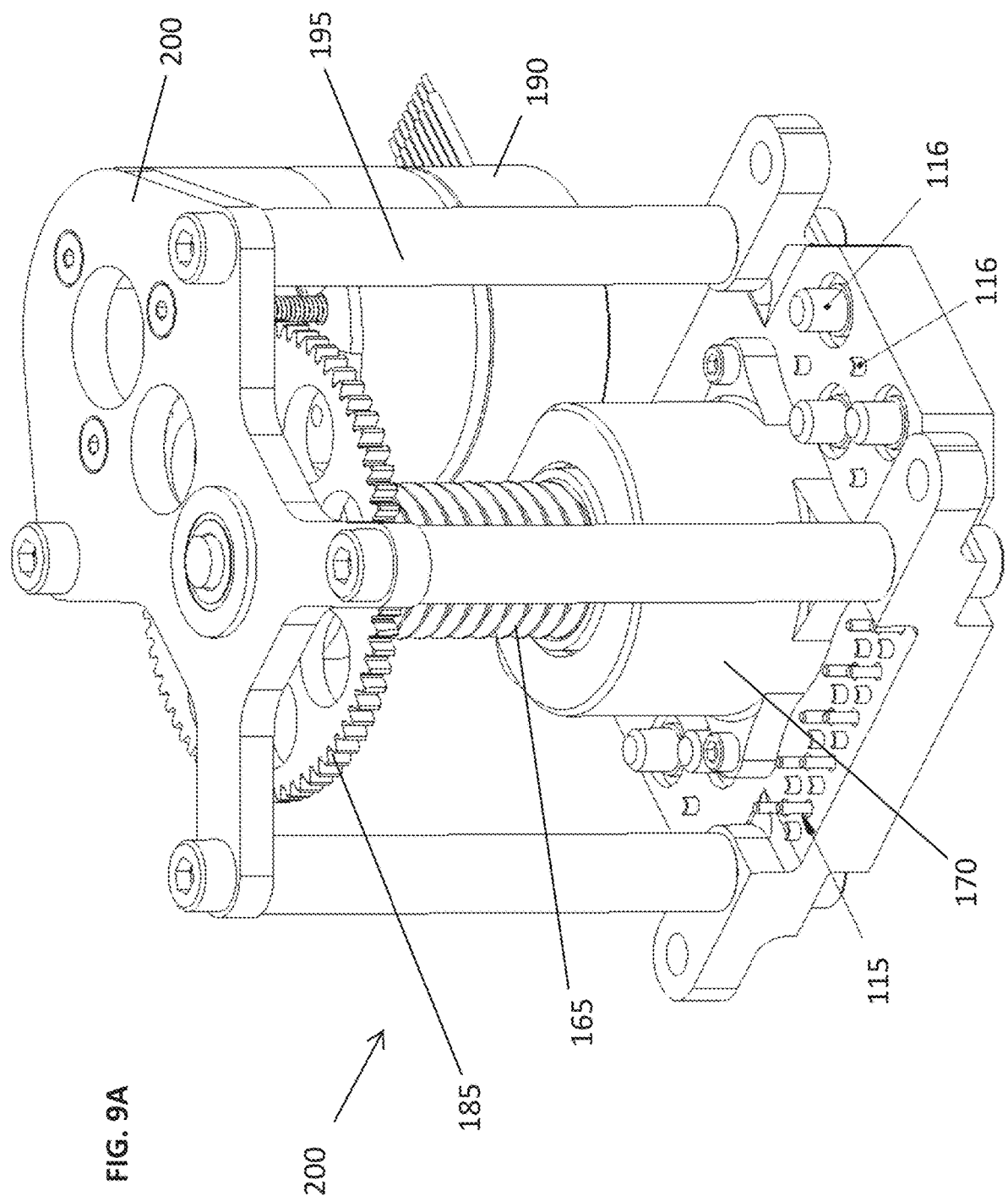
Figure 9C:
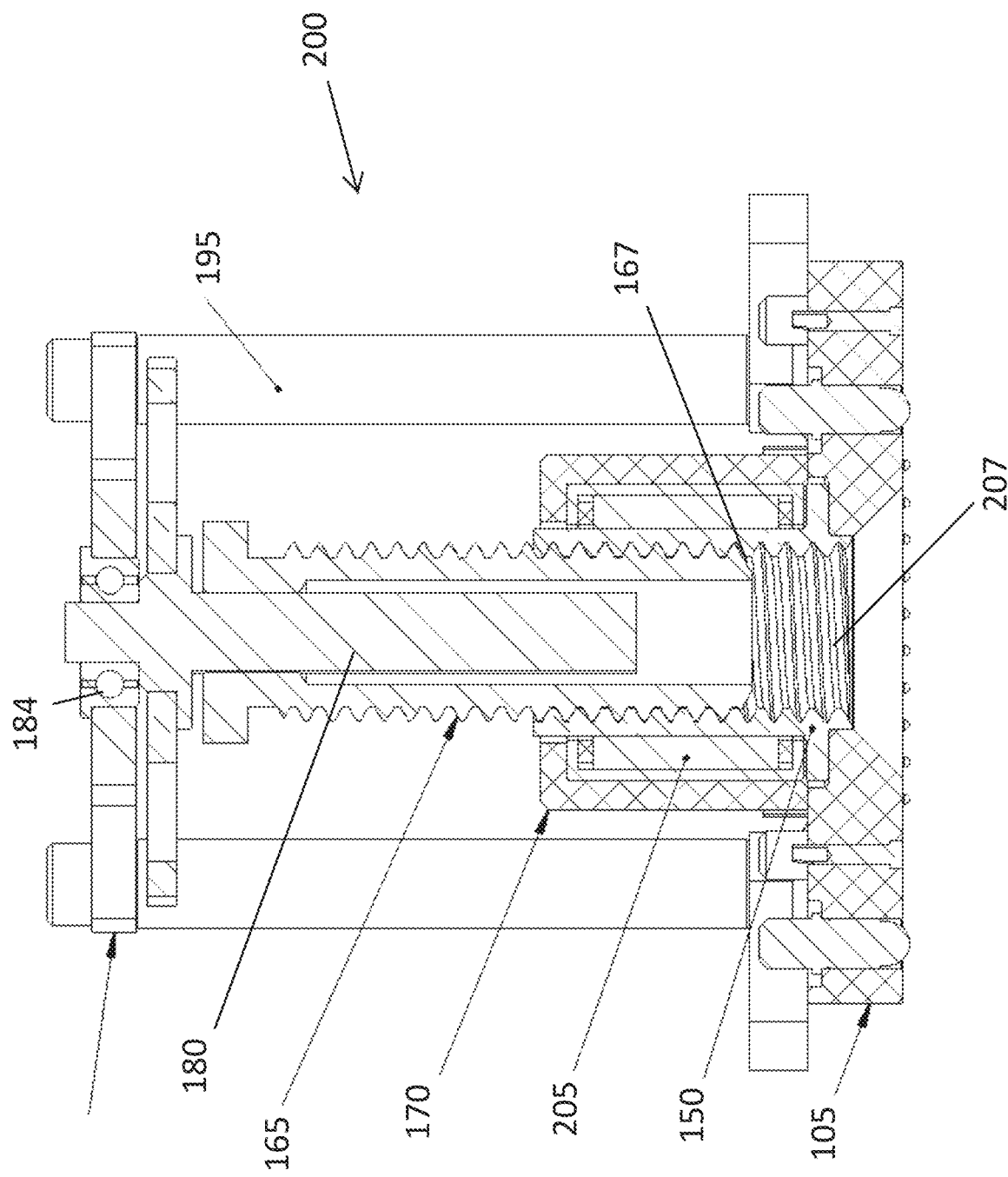

Referring now to FIG. 9A-9C the GRASP mechanism 200 is designed similarly to the GRASP mechanism 100, but as mentioned employs a needle roller clutch 205 to restrict rotation of the docking nut to a single direction.

Docking screw motion in the v1 and v2 prototypes is powered by a COTS brushless DC micro-motor ("BLDC motor") which transmits torque to the driveshaft via a parallel-output transmission. The motor is sized to provide the torque required at the driveshaft to generate the mechanical preload required by the application and maintain sufficient margin. A variety of sensors and mechanism monitoring strategies are used to monitor performance during actuation and verify that joint mechanical preload requirements have been met.

The docking process between two GRASP breadboard mechanisms, representing one 'corner' of the 4-point SYN-ERGEO interface, is shown in FIGS. 10A-10D. Due to the androgynous design of the docking mechanism, either module can be assigned the active role in the operation. In this series of images, the active port is designated by 100A or A, while 100B or B is the passive port.

In the first step, APPROACH, a servicing spacecraft will use its robotic manipulators to present the incoming module for docking to the platform in a predetermined orientation, ensuring the correct docking ports are aligned.

In step 2, the motor of active port A will activate, advancing its docking screw such that it threads through the ratchet nut until the head of the docking screw contacts the ratchet nut, after which the ratchet nut will freewheel and the docking screw will then continue to turn clockwise. In the various embodiments of the mechanisms discussed herein, the docking screw during its initial rotations with rotate through a stationary docking nut. When the docking screw is fully extending through the docking nut and the head of the screw comes into contact with the docking nut, continuous rotation of the docking screw causes a torque on the docking nut such that the nut will begin to turn with the rotation of the screw. In the embodiment of the ratchet/pawl, the teeth and pawl are configured to prevent rotation in one direction but allow slippage when the torque from the screw is pressed into the nut and rotation is continued. In the embodiment of the needle roller clutch it is the configuration of the clutch to prevent rotation in one direction and allow rotational slippage to avoid over-torqueing. These work perfectly in the current GRASP mechanisms.

During the third step, ALIGN, the tip of the mechanism A docking screw will be protruding from the side of the spacecraft, and the screw+nut combination will continue to freely rotate clockwise as the tip of the docking screw is brought into contact with the mechanism B alignment cone. The tip of the screw will traverse the mechanism B alignment cone, correcting any misalignment between the mechanisms so docking screw A engages the threads in the mechanism B ratchet sleeve. During cone traversal, the rotating motion of the screw tip helps reduce contact friction at the screw/alignment cone interface.

Once aligned, the continuously rotating docking screw+ nut combination of mechanism A will engage the threads of the mechanism B docking nut, and the torque provided by the motor actuating mechanism A will tighten the bolted joint and end when the target interface preload is achieved. It is during this step that power and data connections are made.

The transition of the spacecraft module design from a multi-point design per spacecraft side to a single-point GRASP interface has yielded several benefits beyond the cost savings associated with electronics. Chief among them is a reduction in risk via elimination of 3 mechanisms per face, along with their associated potential failure modes. During this transition, the results of a concurrent platform networking module the selection of Gigabit Ethernet as the default inter/intra-modular networking solution, which reduced the GRASP-specific conductor count for a six-port module from >1000 to <400 (estimated; includes wires for spring pin array, motor control and CONOPS sensor package). The difference between the v1 prototype mechanism used for early testing and the GRASP v2 concept is illustrated in FIG. 2.

The single-point concept meets the 90° rotational symmetry requirement and provides fine alignment during docking using a static array of conventional probe+cone alignment features. While the static alignment probes have the potential to shrink the available volume for the spacecraft modules, the mass and complexity savings of moving to a single-point interface prove an acceptable trade.

During exploration of the single-point concept, it was determined in an alternative embodiment to provide a GRASP mechanism with modular spring pin arrays so that the electrical interface can be updated as the station architecture concept evolves.

Figure 12:
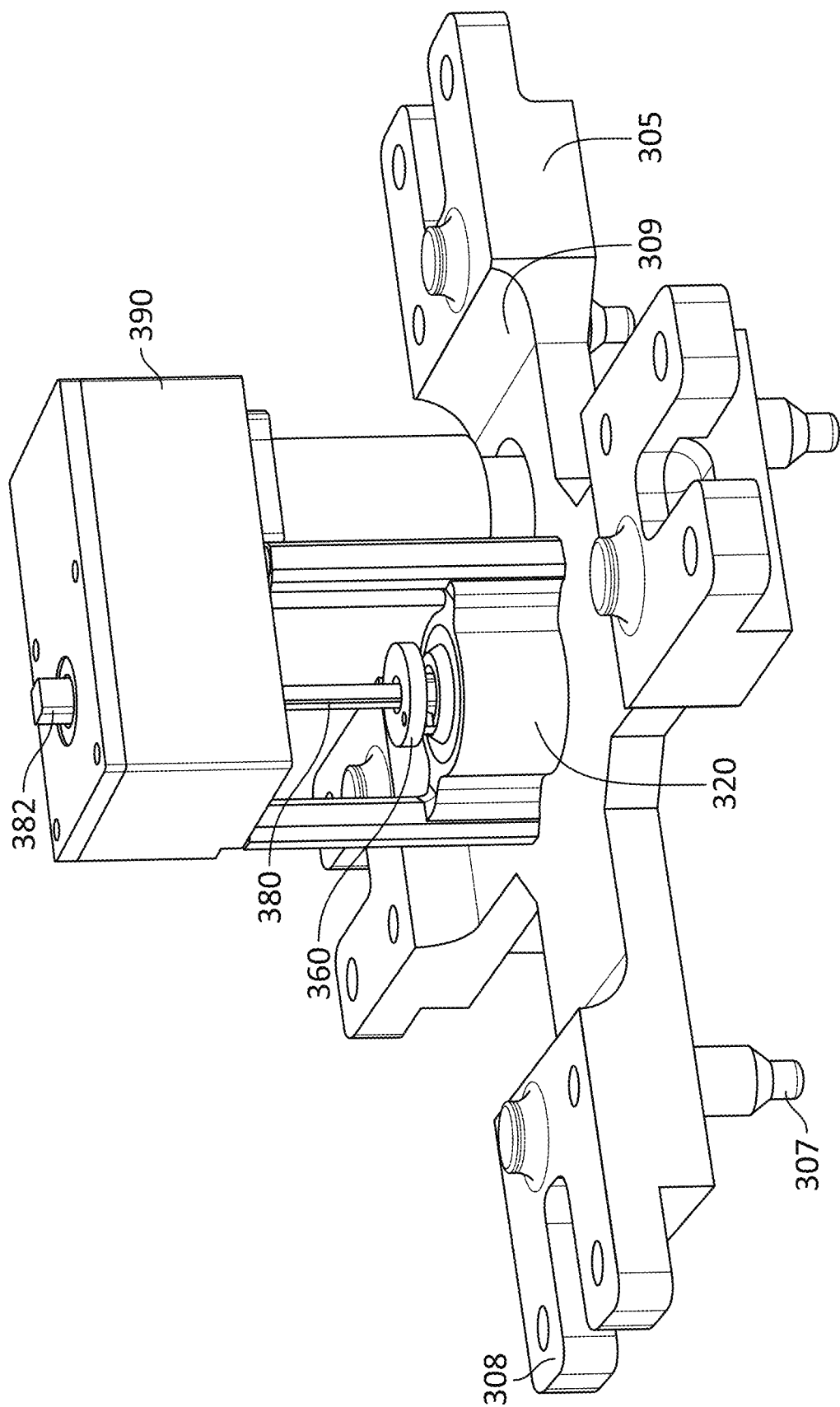
FIG. 12 illustrates a conceptual GRASP v2 drivetrain arrangement (CONOPS sensor package not shown)
Figure 13A:
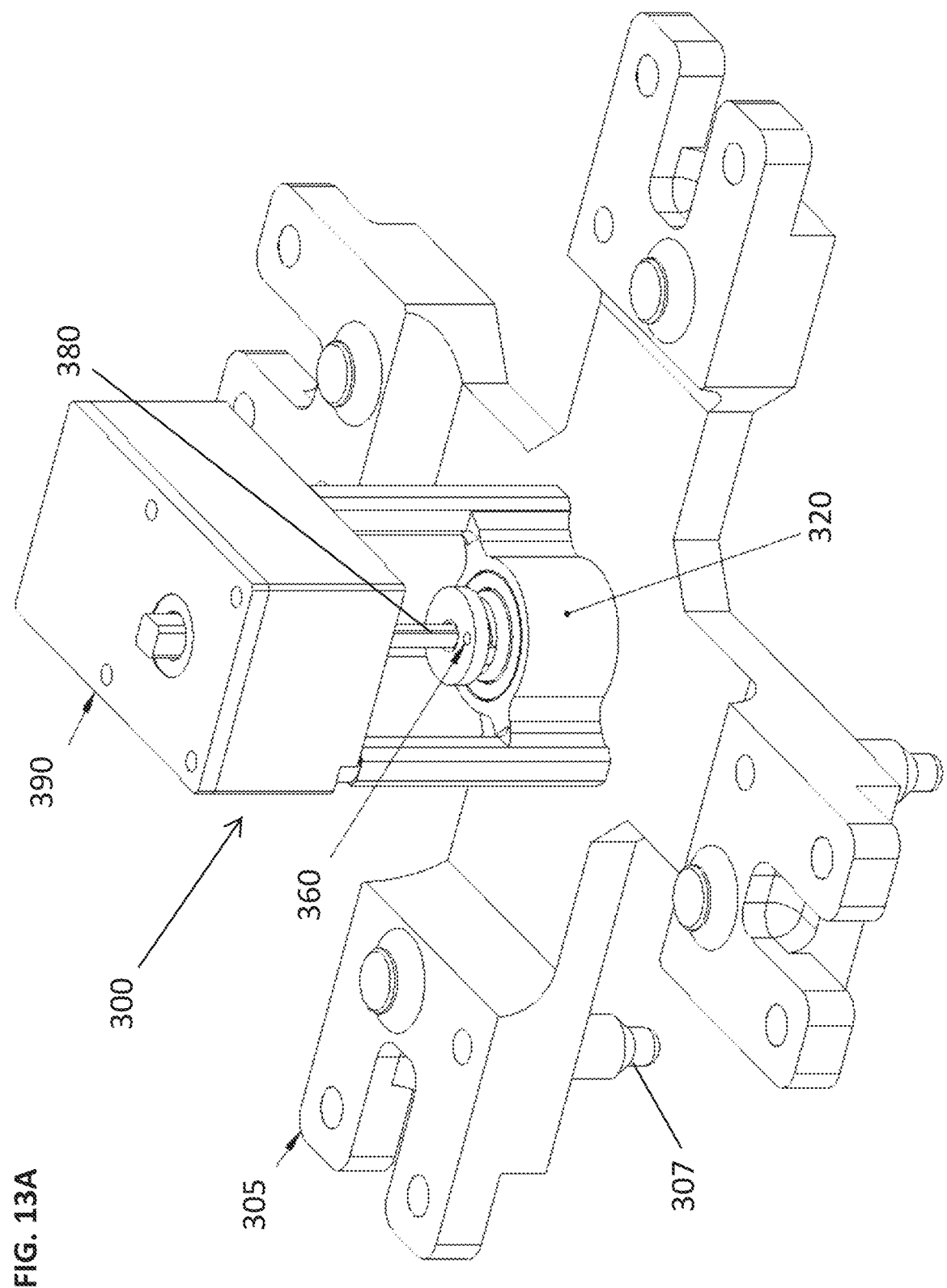
Figure 13B:
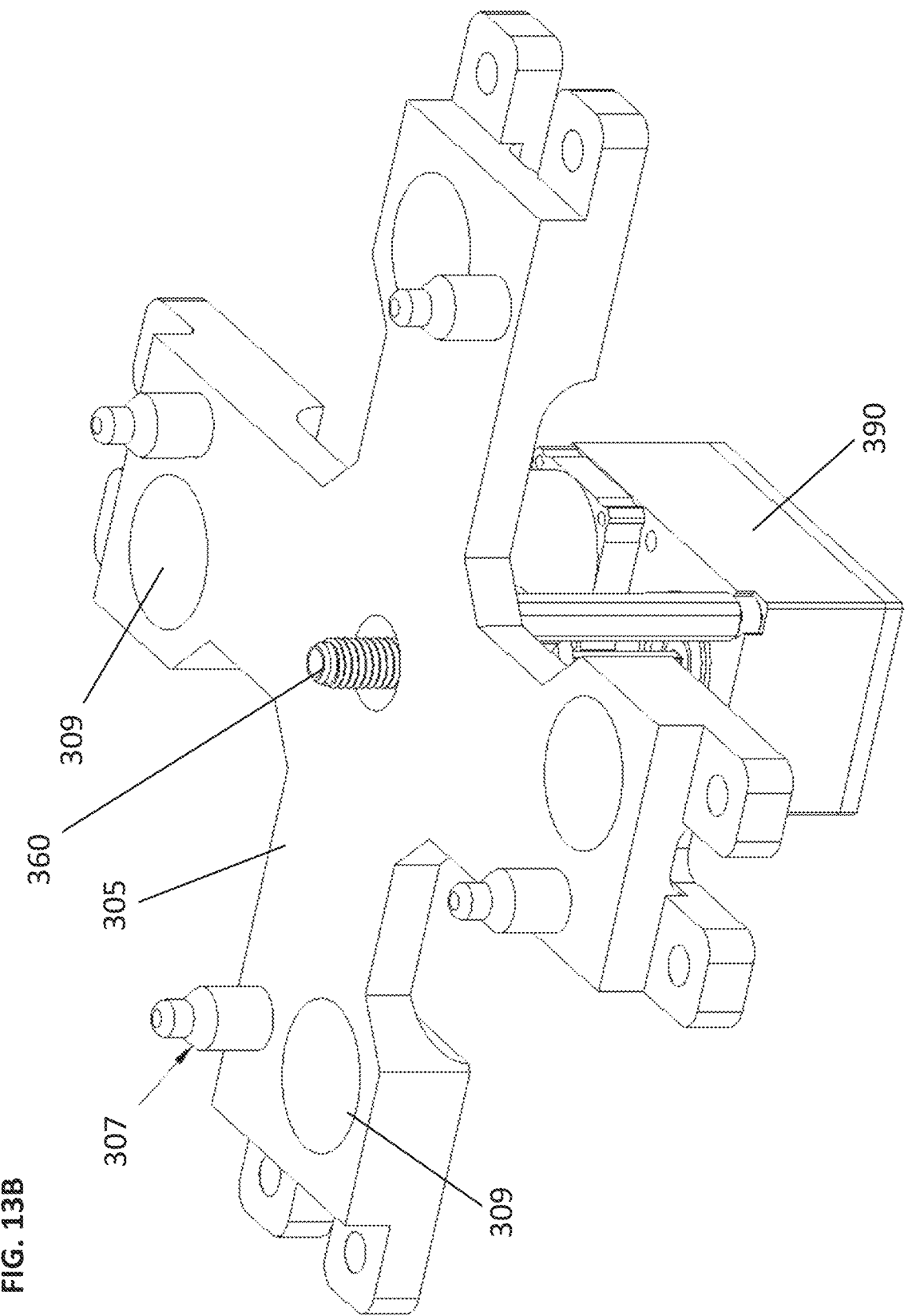
Figure 13D:
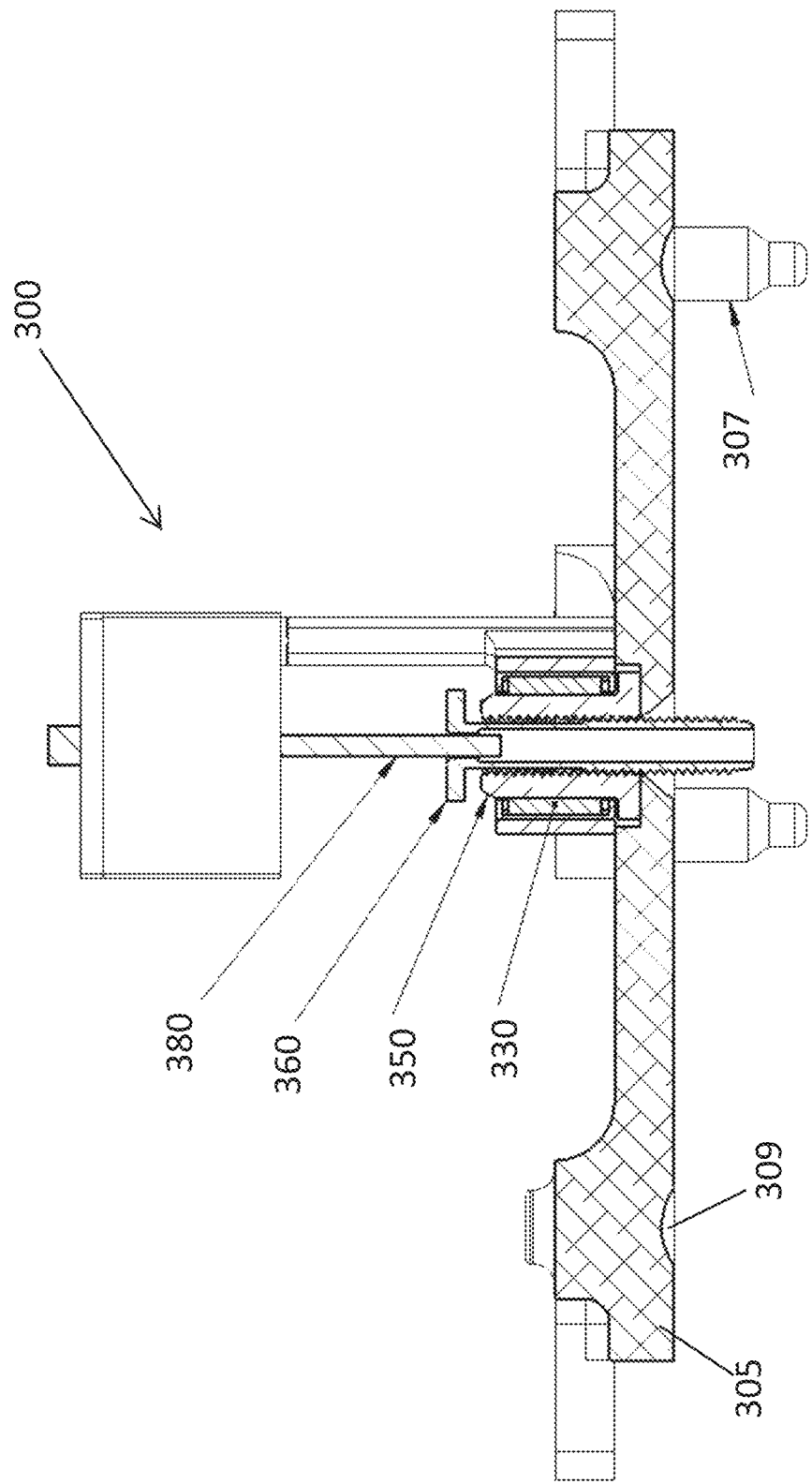

In FIGS. 11-13D, designs of a GRASP mechanism 300 are shown, with ample space available for the spring pin array interposers. FIG. 11 depicts a contact surface of the interface with screw extended, while FIG. 12 illustrates the drivetrain and an early mounting bracket, designed to preserve alignment between the driveshaft and the docking screw throughout the range of travel.

As illustrated the GRASP mechanism 300 has an X shaped base plate 305 having an outward facing surface 306 that would serve as the connection or contact surface to another GRASP mechanism. The base plate 305 also has an inward facing surface 309. The base plate 305 has an alignment probe 307 with corresponding alignment cones 310 that help align two GRASP mechanisms. The probes 307 when approaching the alignment cones on a second GRASP mechanism will ride the cones to the center aligning the two mechanisms together.

The GRASP mechanism 300 has one way bearing mount 320 secured to the base plate 305 over an opening 325 defined in the base plate 305. The outward facing surface 307 may also include an indented surface 330 surrounding the opening 325 to assist in the alignment. The indented surface 330 may have a cylindrical outer wall profile or it may be tapered in a truncated cone 327 towards the opening 325 to help guide the docking screw into the opening. The one-way bearing mount 320 houses the needle roller clutch 330 and the docking nut 350. As noted above, the docking nut 350 has a body portion that includes a threaded interior surface. A docking screw 360 is threaded into the docking nut 350.

The docking screw 360 has an interior channel 365 keyed to receive a profiled driveshaft 380 that when inserted and rotated by an output shaft 382 3 in either direction will rotate the docking screw 360. The docking screw 360 may further have an extended flat top or dog end 367 used to locate into the docking nut of the other mechanism during connection.

The driveshaft 380 is controlled by a BLDC motor 385 with a parallel output transmission 390 and field director 395. Posts 397 are secured between the base plate 305 and the transmission housing. Lastly, the base plate 305 includes interface mounts 308 permitting the GRASP mechanism 300 to be secured to a surface of a spacecraft.

As defined by the drawings herein, there is provided a first GRASP mechanism for a spacecraft docking system and for use with a second GRASP mechanism similarly configured. Each of the GRASP mechanisms include:

(a) a base plate having an opening bored through, wherein the base plate has an outward facing connection surface configured to position against a second base plate of the second GRASP mechanism when the first and second GRASP mechanisms are docked together;

(b) a two-piece housing unit secured to the base plate over the opening, the two-piece housing unit defined by a lower housing and an upper housing, the lower housing includes a lip surrounding the opening and a ridge extending from the lip to a circular surface wall extending away from the base plate;

(c) a docking nut being positioned against the ridge and over the opening, the docking nut having a threaded interior surface;

(d) a rotational restriction mechanism being positioned against the docking nut within the circular surface wall to engage the docking nut and configured to permit rotation of the docking nut in a single direction;

(e) a docking screw threaded into the docking nut, the docking screw having an interior channel keyed to receive a drive shaft; and (f) a motor mechanism configured to rotate the docking screw via the drive shaft.

Figure 10A:
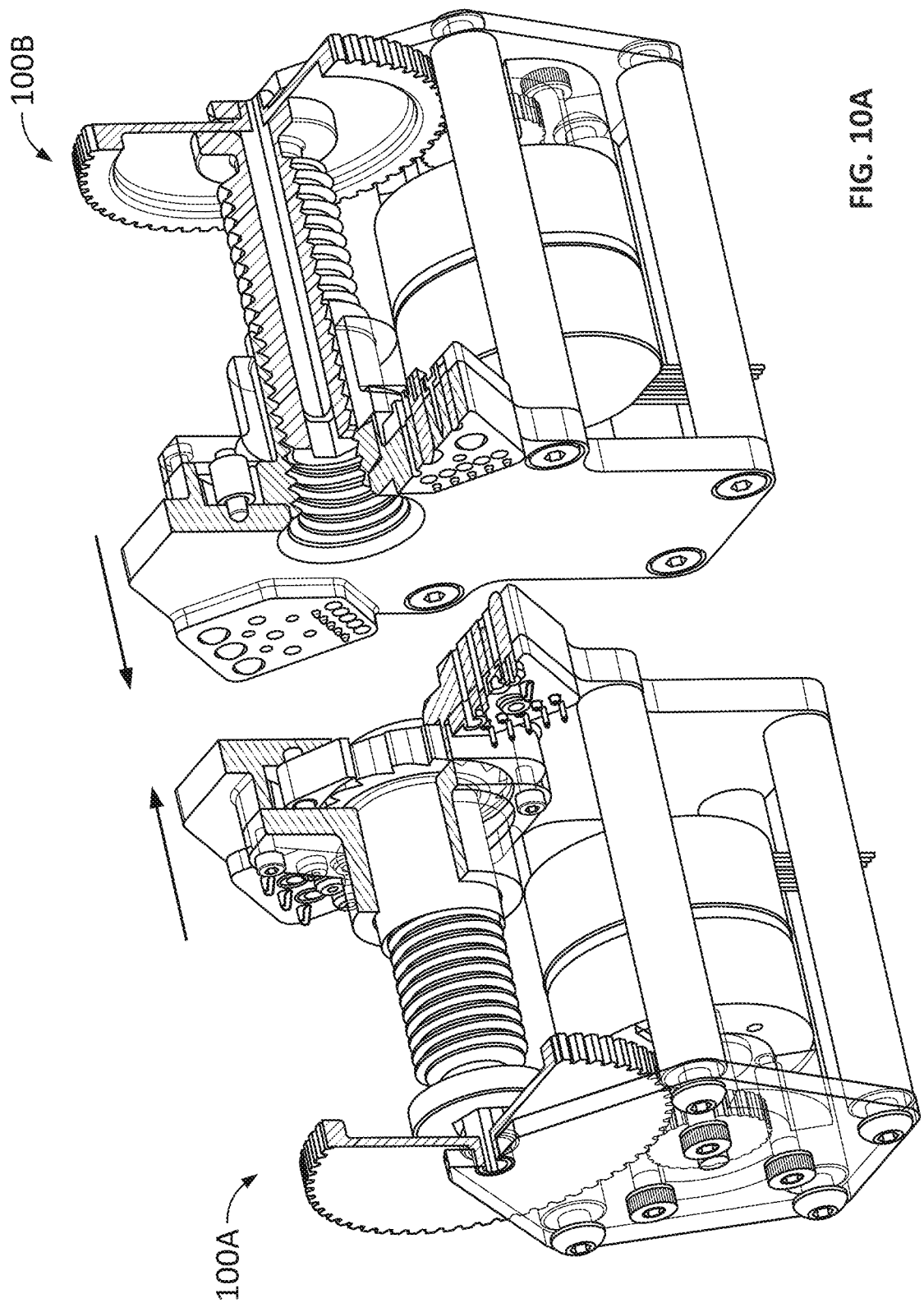
FIGS. 10A-10D show the docking process between two GRASP mechanisms, shown in 4 steps; the active mechanism is denoted by A, while B is the passive mechanism.
Figure 10B:
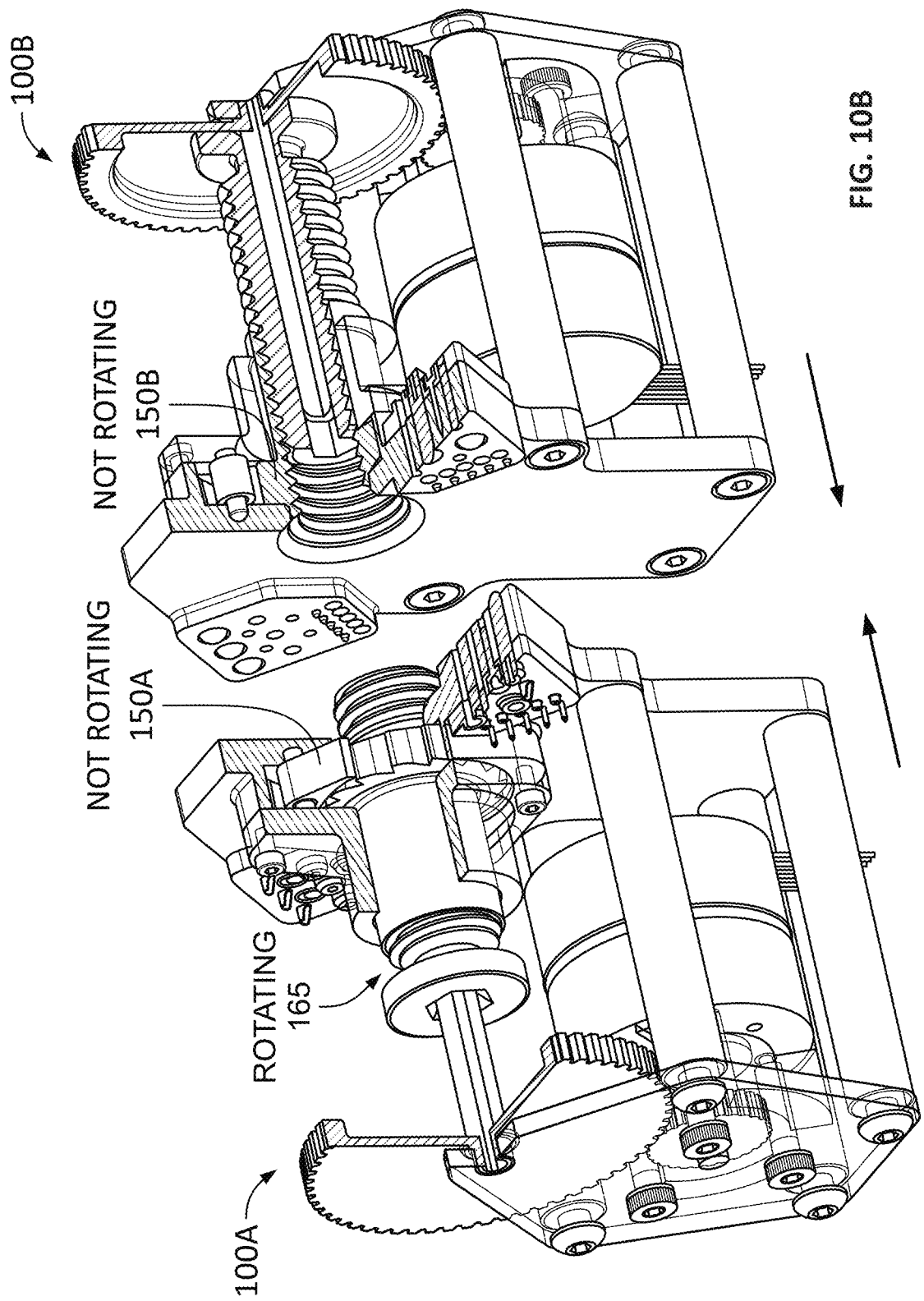
Figure 10C:
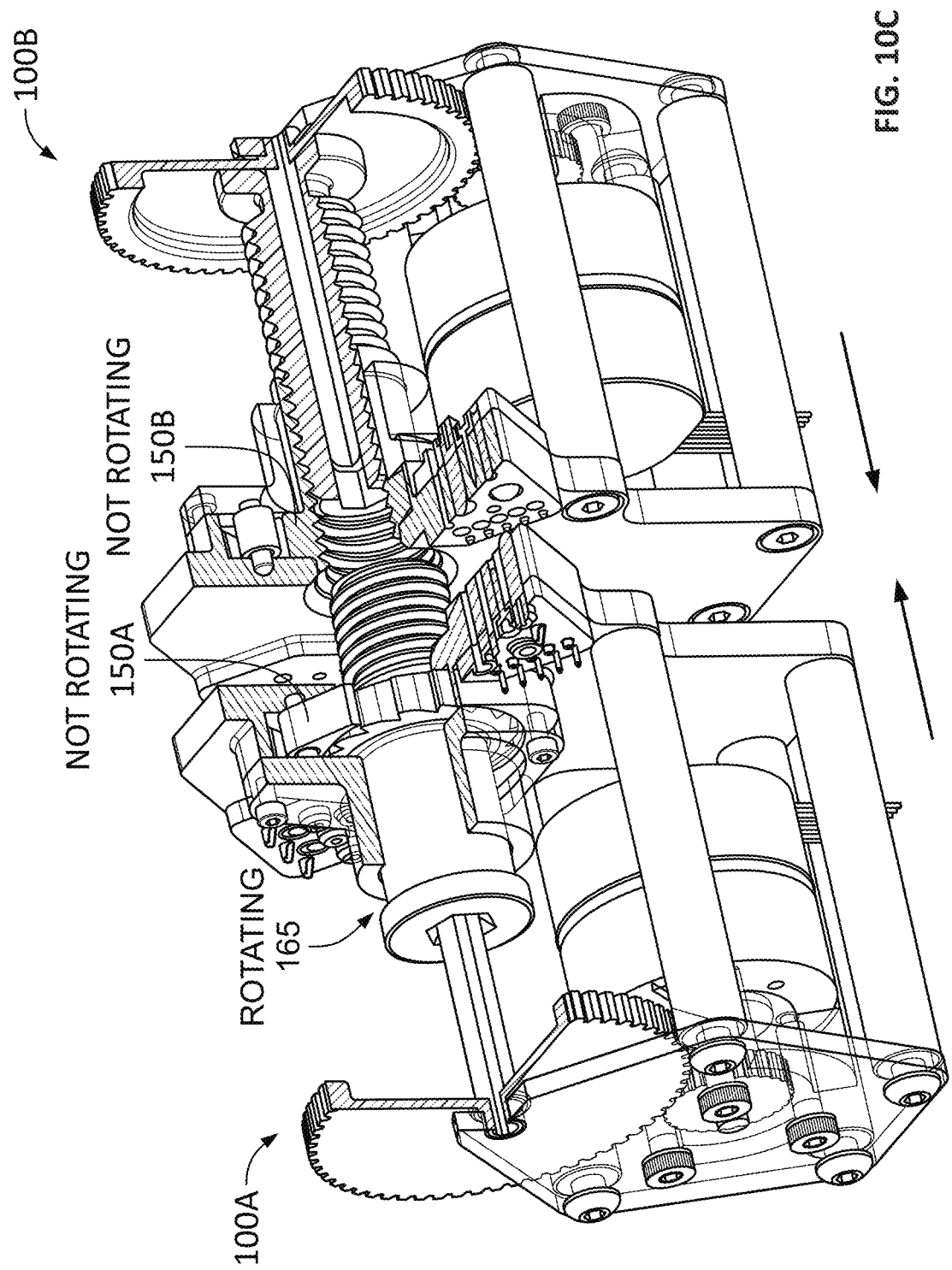
Figure 10D:
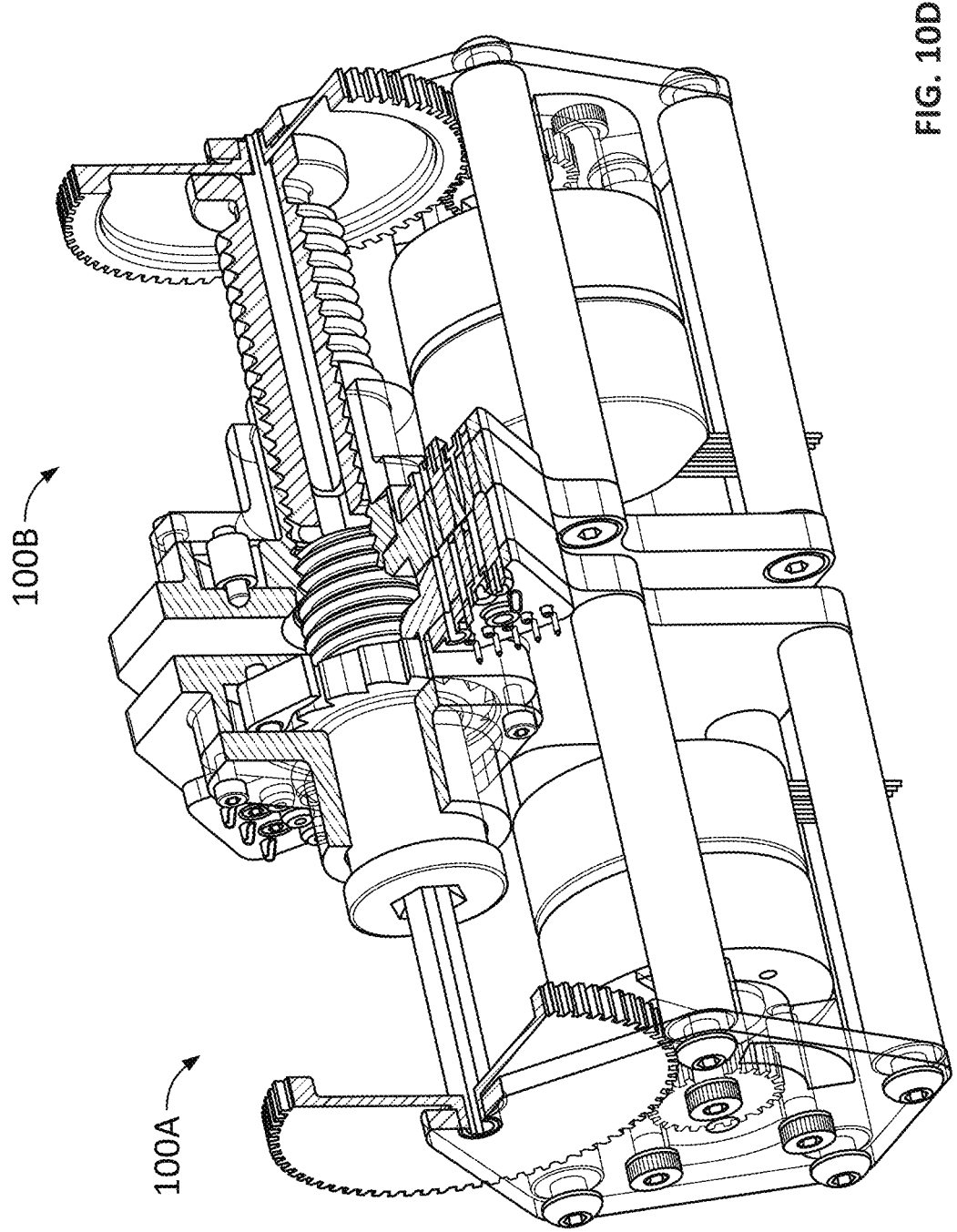

Based on the above, the docking screw has a screw length SL configured to extend through the docking nut and through the base plate when the docking screw is in an extension position (FIG. 6B) and the docking nut has a nut length NL configured to define a receiving space 207 (FIG. 9C) below the docking screw 165 when the docking screw is un-extended through the docking nut whereby the receiving space 207 of the docking nut is further configured to receive a portion of a second docking screw in the extension position when the first and second GRASP mechanisms are docked together (FIG. 10D).

In various embodiments, the rotational restriction mechanism is configured to (i) allow one-way slip rotation of the docking nut when the docking screw is fully inserted through the docking nut such that a head of the docking screw is in contact with the docking nut; and (ii) prevent the counter rotation of the docking nut, such as when the docking screw is inserted and rotated into the receiving space of a second GRASP mechanism during a docking of first and second GRASP mechanisms.

The rotational restriction mechanisms can either be employed by a lower ratchet toothed section on the docking nut rotatably and a pawl mechanism positioned to engage the exterior lower ratchet toothed section to permit rotation of the docking nut in a single direction. Alternatively, the rotational restriction mechanism can be defined by having a needle roller clutch positioned in the lower housing and configured to permit rotation of the docking nut in a single direction.

In another embodiment, the GRASP mechanism has a base plate with an X shape and wherein the outward facing connection surface include one or more alignment probes and one or more alignment indented cones, wherein when the first and second GRASP mechanisms are being docked together, the one or more alignment probes are configured to insert and slide within corresponding one or more of the alignment indented cones to adjust a position of the first and second GRASP mechanisms.

As provided herein, the GRASP mechanism are typically utilized a part of a docking system configured to dock two surfaces defined on separate spacecraft. The docking system includes at least a pair of opposing guideless resilient androgynous serial port (GRASP) mechanisms. Each of the GRASP mechanisms being positioned on the separate spacecraft and which connect to each other to dock the separate spacecraft together. The docking system further includes a mounting platform configured on a side of separate spacecraft, and wherein the sides of the separate spacecraft being configured for docking to each other. Each surface is designed to have at least one GRASP mechanism secured to the mounting platform. The GRASP mechanisms are defined each to include: (i) a base plate having an opening bored through, wherein the base plate has an outward facing connection surface configured to position against a second base plate of the opposing GRASP mechanism when the separate spacecraft are docked together; (ii) a docking nut being positioned over the opening, the docking nut having a threaded interior surface; (iii) a rotational restriction mechanism being positioned against the docking nut to engage the docking nut and configured to permit rotation of the docking nut in a single direction; (iv) a docking screw threaded into the docking nut; (v) a motor mechanism configured to thread the docking screw through the docking nut; and (vi) wherein the docking screw has a screw length configured to extend through the docking nut and through the base plate when the docking screw is in an extension position and wherein the docking nut has a nut length configured to define a receiving space below the docking screw when the docking screw is un-extended through the docking nut whereby the receiving space of the docking nut is further configured to receive a portion of a second docking screw in the extension position when the opposing GRASP mechanisms are docking together.

While particular elements, embodiments, and applications of the present invention have been shown and described, it is understood that the invention is not limited thereto because modifications may be made by those skilled in the art, particularly in light of the foregoing teaching. It is therefore contemplated by the appended claims to cover such modifications and incorporate those features which come within the spirit and scope of the invention.

We claim:

1. A guideless resilient androgynous serial port (GRASP) mechanism for use with a secondary docking system for docking two separate components together, the GRASP mechanism comprising:

a base plate having an opening bored through, wherein the base plate has an outward facing connection surface configured to position against the secondary docking system when the GRASP mechanism and the secondary docking system are docked together;

a two-piece housing unit secured to the base plate over the opening, the two-piece housing unit defined by a lower housing and an upper housing, the lower housing includes a lip surrounding the opening and a ridge extending from the lip to a circular surface wall extending away from the base plate, and a channel cut out is further defined along a portion of the circular surface wall;

a docking nut being positioned against the ridge and over the opening, the docking nut having a threaded interior surface and an exterior lower ratchet toothed section rotatably situated within the circular surface wall of the lower housing;

a pawl mechanism being positioned in the channel cut out and biased to engage the exterior lower ratchet toothed section to permit rotation of the docking nut in a single direction;

a docking screw threaded into the docking nut, the docking screw having an interior channel keyed to receive a drive shaft;

a motor mechanism configured to rotate the docking screw via the drive shaft; and wherein the docking screw has a screw length configured to extend through the docking nut and through the base plate when the docking screw is in an extension position and wherein the docking nut has a nut length configured to define a receiving space below the docking screw when the docking screw is un-extended through the docking nut whereby the receiving space of the docking nut is further configured to receive a portion of a second docking screw in an extension position when the GRASP mechanism and the secondary docking system are docked together.

2. The GRASP mechanism of claim 1, wherein the base plate of the GRASP mechanism include a plurality of channels bored through and configured as conduits for signal ports and signal and data pins to provide electrical and data communications between the GRASP mechanism and the secondary docking system when secured and connected.

3. The GRASP mechanism of claim 2, wherein the outward facing connection surface of the base plate includes an indented surface surrounding the opening, the indented surface being configured to assist in the alignment when the GRASP mechanism and the secondary docking system are secured together.

4. The GRASP mechanism of claim 3, wherein the indented surface has a profile of a truncated cone tapered towards the opening.

5. The GRASP mechanism of claim 1, wherein the upper housing being attached to the lower housing to secure the docking nut and pawl mechanism in position, the upper housing includes an upper housing opening sized over the docking nut to receive the docking screw.

6. The GRASP mechanism of claim 3, wherein the docking screw has a dog end configured to guide the docking screw into an opening defined on the secondary docking system when the GRASP mechanism and the secondary docking system are positioned together.

7. The GRASP mechanism of claim 1 further comprising, a mounting plate opposed to the position of the base plate and wherein a top portion of the drive shaft is rotatably secured thereto.

8. The GRASP mechanism of claim 3, wherein the pawl mechanism in combination with the lower ratchet toothed section of the docking nut and the docking screw is configured to:
 allow one-way slip rotation of the docking nut when the docking screw is fully inserted through the docking nut such that a head of the docking screw is in contact with the docking nut; and
 prevent the counter rotation of the docking nut, such as when the docking screw is inserted and rotated into a receiving space of the secondary docking system during a docking of the GRASP mechanism and the secondary docking system.

9. A guideless resilient androgynous serial port (GRASP) mechanism for a spacecraft docking system and for use with a secondary docking system, wherein the GRASP mechanism comprising:
 a base plate having an opening bored through, wherein the base plate has an outward facing connection surface configured to position against the secondary docking system when the GRASP mechanism and the secondary docking system are docked together;
 a two-piece housing unit secured to the base plate over the opening, the two-piece housing unit defined by a lower housing and an upper housing, the lower housing includes a lip surrounding the opening and a ridge extending from the lip to a circular surface wall extending away from the base plate;
 a docking nut being positioned against the ridge and over the opening, the docking nut having a threaded interior surface;
 a rotational restriction mechanism being positioned against the docking nut within the circular surface wall to engage the docking nut and configured to permit rotation of the docking nut in a single direction;
 a docking screw threaded into the docking nut, the docking screw having an interior channel keyed to receive a drive shaft;
 a motor mechanism configured to rotate the docking screw via the drive shaft; and
 wherein the docking screw has a screw length configured to extend through the docking nut and through the base plate when the docking screw is in an extension position and wherein the docking nut has a nut length configured to define a receiving space below the docking screw when the docking screw is un-extended through the docking nut whereby the receiving space of the docking nut is further configured to receive a portion of a second docking screw in the extension position and defined by the secondary docking system when the GRASP mechanism and the secondary docking system are docked together.

10. The GRASP mechanism of claim 9, wherein the rotational restriction mechanism is configured to:
 allow one-way slip rotation of the docking nut when the docking screw is fully inserted through the docking nut such that a head of the docking screw is in contact with the docking nut; and
 prevent the counter rotation of the docking nut, such as when the docking screw is inserted and rotated into a receiving space of the secondary docking system during a docking of the GRASP mechanism and the secondary docking system.

11. The GRASP mechanism of claim 9, wherein the docking nut has an exterior lower ratchet toothed section rotatably situated within the circular surface wall of the lower housing, and wherein the lower housing further includes a channel cut out defined along a portion of the circular surface wall, and wherein the rotational restriction mechanism is defined by having a pawl mechanism positioned in the channel cut out and biased to engage the exterior lower ratchet toothed section to permit rotation of the docking nut in a single direction.

12. The GRASP mechanism of claim 9, wherein the rotational restriction mechanism is defined by having a needle roller clutch positioned in the lower housing and configured to permit rotation of the docking nut in a single direction.

13. The GRASP mechanism of claim 9, wherein the base plate of the GRASP mechanism include a plurality of channels bored through and configured as conduits for signal ports and signal and data pins to provide electrical and data communications between the GRASP mechanism and the secondary docking system when secured and connected.

14. The GRASP mechanism of claim 12, wherein the outward facing connection surface of the base plate includes an indented surface surrounding the opening, the indented surface being configured to assist in the alignment when the GRASP mechanism and the secondary docking system are secured together.

15. The GRASP mechanism of claim 9, wherein the indented surface has a profile of a truncated cone tapered towards the opening.

16. The GRASP mechanism of claim 9, wherein the docking screw has a dog end configured to guide the docking screw into an opening of the secondary docking system when the GRASP mechanism and the secondary docking system are positioned together.

17. The GRASP mechanism of claim 9 further comprising, a mounting plate opposed to the position of the base plate and wherein a top portion of the drive shaft is rotatably secured thereto.

18. The GRASP mechanism of claim 9, wherein the base plate has an X shape and wherein the outward facing connection surface include one or more alignment probes and one or more alignment indented cones to match a similar configuration defined on the secondary docking system, wherein when the GRASP mechanism and the secondary docking system are being docked together, the one or more alignment probes are configured to insert and slide within corresponding one or more of the alignment indented cones to adjust a position of the GRASP mechanism.

19. A primary docking system configured to dock two surfaces, the primary docking system comprising at one guideless resilient androgynous serial port (GRASP) mechanism for docking with a secondary docking system, wherein the GRASP mechanism and the secondary docking system being positioned on separate surfaces and which connect to each other to dock the separate surfaces together, the primary docking system further comprising:
- a mounting platform configured on a side of separate spacecraft, wherein the sides of the separate surfaces being configured for docking to each other;
- at least one GRASP mechanism secured to the mounting platform of the side of the separate surface, and wherein each of the GRASP mechanisms including:
  - a base plate having an opening bored through, wherein the base plate has an outward facing connection surface configured to position against a second base plate of the opposing secondary docking system when the separate surfaces are docked together;
  - a docking nut being positioned over the opening, the docking nut having a threaded interior surface;
  - a rotational restriction mechanism being positioned against the docking nut to engage the docking nut and configured to permit rotation of the docking nut in a single direction;
  - a docking screw threaded into the docking nut;
  - a motor mechanism configured to thread the docking screw through the docking nut; and
  - wherein the docking screw has a screw length configured to extend through the docking nut and through the base plate when the docking screw is in an extension position and wherein the docking nut has a nut length configured to define a receiving space below the docking screw when the docking screw is un-extended through the docking nut whereby the receiving space of the docking nut is further configured to receive a portion of a secondary docking screw defined from the secondary docking system in the extension position when the primary and secondary docking systems are docking together.

20. The primary docking system of claim 19, wherein the base plate of each of the GRASP mechanisms has an X shape and wherein the outward facing connection surface include one or more alignment probes and one or more alignment indented cones, wherein when the at least one GRASP mechanism is being docked with the secondary docking system, the one or more alignment probes are configured to insert and slide within corresponding one or more of the alignment indented cones to adjust a position of the primary and secondary docking systems.

21. The primary docking system of claim 20, wherein the outward facing connection surface, of the base plate of the at least one GRASP mechanism, includes an indented surface surrounding the opening, the indented surface being configured to assist in the alignment when the separate surfaces dock.

22. The primary docking system of claim 19, wherein the docking nut has an exterior lower ratchet toothed section rotatably situated within the circular surface wall of the lower housing, and wherein the lower housing further includes a channel cut out defined along a portion of the circular surface wall, and wherein the rotational restriction mechanism is defined by having a pawl mechanism positioned in the channel cut out and biased to engage the exterior lower ratchet toothed section to permit rotation of the docking nut in a single direction.

23. The primary docking system of claim 19, wherein the rotational restriction mechanism is defined by having a needle roller clutch positioned in the lower housing and configured to permit rotation of the docking nut in a single direction.

\* \* \* \* \*